(12) United States Patent
Ichii

(10) Patent No.: US 8,767,029 B2
(45) Date of Patent: Jul. 1, 2014

(54) LIGHT SOURCE DEVICE, OPTICAL SCANNING DEVICE, AND IMAGE FORMING APPARATUS

(75) Inventor: Daisuke Ichii, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 191 days.

(21) Appl. No.: 12/964,100

(22) Filed: Dec. 9, 2010

(65) Prior Publication Data
US 2011/0141217 A1 Jun. 16, 2011

(30) Foreign Application Priority Data
Dec. 14, 2009 (JP) ................................ 2009-282442

(51) Int. Cl.
B41J 2/385 (2006.01)
B41J 15/14 (2006.01)
B41J 2/435 (2006.01)
B41J 27/00 (2006.01)

(52) U.S. Cl.
USPC ........... 347/246; 347/134; 347/243; 347/259; 347/261

(58) Field of Classification Search
USPC ......... 347/111, 112, 129, 134, 224, 225, 233, 347/241, 243, 246, 256, 258, 259, 260, 261
See application file for complete search history.

(56) References Cited

U.S. PATENT DOCUMENTS

| | | | |
|---|---|---|---|
| 7,218,432 B2 | 5/2007 | Ichii et al. | |
| 7,417,777 B2 | 8/2008 | Saisho et al. | |
| 7,443,558 B2 | 10/2008 | Sakai et al. | |
| 7,545,547 B2 | 6/2009 | Hayashi et al. | |
| 7,586,661 B2 | 9/2009 | Ichii | |
| 7,623,280 B2 | 11/2009 | Hirakawa et al. | |
| 7,626,774 B2 | 12/2009 | Kinoshita et al. | |
| 7,663,657 B2 | 2/2010 | Ichii et al. | |
| 7,672,032 B2 | 3/2010 | Hayashi et al. | |
| 7,687,762 B2 | 3/2010 | Watanabe et al. | |

(Continued)

FOREIGN PATENT DOCUMENTS

| | | |
|---|---|---|
| JP | 2003-283031 | 10/2003 |
| JP | 2005-156933 | 6/2005 |

(Continued)

OTHER PUBLICATIONS

Office Action issued in corresponding Japanese Application No. 2009-282442 on Dec. 11, 2013.

*Primary Examiner* — Alessandro Amari
*Assistant Examiner* — Kendrick Liu
(74) *Attorney, Agent, or Firm* — Oblon, Spivak, McClelland, Maier & Neustadt, L.L.P.

(57) ABSTRACT

In a light source device including an aperture member that regulates a light beam, $|(Pap1-Pap2)/Pap2|<|(P1-P2)/P2|$ is satisfied where P2 is a light intensity of the light beam entering the aperture member at a time t2 when 2 microseconds have passed since current was applied to the laser, P1 is a light intensity of the light beam entering the aperture member at a time t1 when 40 nanoseconds have passed since a light intensity of the light beam entering the aperture member reached 0.1 time the light intensity P2, Pap2 is a light intensity of the light beam output from the aperture member at the time t2, and Pap1 is a light intensity of the light beam output from the aperture member at a time t1' when 40 nanoseconds have passed since a light intensity of the light beam output from the aperture member reached 0.1 time the light intensity Pap2.

11 Claims, 17 Drawing Sheets

(56) References Cited

U.S. PATENT DOCUMENTS

| | | |
|---|---|---|
| 7,701,480 B2 | 4/2010 | Omori et al. |
| 7,738,007 B2 | 6/2010 | Ichii et al. |
| 7,800,805 B2 | 9/2010 | Hayashi et al. |
| 2004/0037337 A1* | 2/2004 | Jagadish et al. ............ 372/46 |
| 2007/0211325 A1 | 9/2007 | Ichii |
| 2007/0253047 A1 | 11/2007 | Ichii et al. |
| 2007/0253048 A1 | 11/2007 | Sakai et al. |
| 2008/0055672 A1 | 3/2008 | Watanabe et al. |
| 2008/0068690 A1 | 3/2008 | Ichii |
| 2008/0123159 A1 | 5/2008 | Hayashi et al. |
| 2008/0192319 A1 | 8/2008 | Miyatake et al. |
| 2008/0212999 A1 | 9/2008 | Masuda et al. |
| 2008/0267662 A1 | 10/2008 | Arai et al. |
| 2008/0267663 A1 | 10/2008 | Ichii et al. |
| 2009/0065685 A1* | 3/2009 | Watanabe et al. ......... 250/237 R |
| 2009/0175657 A1 | 7/2009 | Yoshii et al. |
| 2009/0195849 A1 | 8/2009 | Ichii et al. |
| 2009/0295900 A1 | 12/2009 | Ichii |
| 2009/0315967 A1 | 12/2009 | Hayashi et al. |
| 2010/0060712 A1 | 3/2010 | Sato et al. |
| 2010/0195681 A1 | 8/2010 | Tatsuno et al. |
| 2010/0214633 A1 | 8/2010 | Sato et al. |

FOREIGN PATENT DOCUMENTS

| | | |
|---|---|---|
| JP | 2006-91157 | 4/2006 |
| JP | 2006-259098 | 9/2006 |
| JP | 2006-332142 | 12/2006 |
| JP | 2008-213246 | 9/2008 |
| JP | 2008-268683 | 11/2008 |

* cited by examiner

FIG. 20

| | SCANNING LENS OF DEFLECTOR SIDE | |
|---|---|---|
| | INCIDENT SURFACE | EMITTING SURFACE |
| $R_{m0}$ | −125.930 | −60.678 |
| $R_{s0}$ | −500 | −550 |
| $a_{00}$ | 0 | 0 |
| $a_{04}$ | $6.91397 \times 10^{-7}$ | $7.94205 \times 10^{-7}$ |
| $a_{06}$ | $-1.17421 \times 10^{-10}$ | $8.10435 \times 10^{-11}$ |
| $a_{08}$ | $-7.59529 \times 10^{-14}$ | $-4.46442 \times 10^{-14}$ |
| $a_{10}$ | $4.98921 \times 10^{-17}$ | $6.78493 \times 10^{-18}$ |
| $a_{12}$ | $-7.99430 \times 10^{-21}$ | $4.18587 \times 10^{-21}$ |
| $b_{01}$ | − | $9.48903 \times 10^{-6}$ |
| $b_{02}$ | − | $-4.04246 \times 10^{-6}$ |
| $b_{03}$ | − | $7.83108 \times 10^{-9}$ |
| $b_{04}$ | − | $-2.32948 \times 10^{-9}$ |
| $b_{05}$ | − | $-1.27532 \times 10^{-11}$ |
| $b_{06}$ | − | $1.22637 \times 10^{-12}$ |
| $b_{07}$ | − | $2.55440 \times 10^{-15}$ |
| $b_{08}$ | − | $4.46134 \times 10^{-16}$ |
| $b_{09}$ | − | $6.68092 \times 10^{-19}$ |
| $b_{10}$ | − | $-1.67752 \times 10^{-19}$ |

FIG. 21

| | SCANNING LENS OF IMAGE SURFACE SIDE | |
|---|---|---|
| | INCIDENT SURFACE | EMITTING SURFACE |
| $R_{m0}$ | −10000 | 520.144 |
| $R_{s0}$ | 268.018 | −44.257 |
| $a_{00}$ | 0 | 0 |
| $a_{04}$ | $3.29667 \times 10^{-7}$ | $1.27206 \times 10^{-7}$ |
| $a_{06}$ | $-7.12268 \times 10^{-11}$ | $-4.62723 \times 10^{-11}$ |
| $a_{08}$ | $6.28263 \times 10^{-15}$ | $4.04792 \times 10^{-15}$ |
| $a_{10}$ | $-2.72118 \times 10^{-19}$ | $-1.65776 \times 10^{-19}$ |
| $a_{12}$ | $4.69377 \times 10^{-24}$ | $2.58917 \times 10^{-24}$ |
| $b_{01}$ | $1.92169 \times 10^{-6}$ | − |
| $b_{02}$ | $-9.73515 \times 10^{-7}$ | $3.26958 \times 10^{-7}$ |
| $b_{03}$ | $2.78624 \times 10^{-10}$ | − |
| $b_{04}$ | $7.99963 \times 10^{-11}$ | − |
| $b_{05}$ | $-8.27927 \times 10^{-14}$ | − |
| $b_{06}$ | $1.16623 \times 10^{-14}$ | − |
| $b_{07}$ | $8.54769 \times 10^{-18}$ | − |
| $b_{08}$ | $-1.73644 \times 10^{-18}$ | − |
| $b_{09}$ | $-3.04034 \times 10^{-22}$ | − |
| $b_{10}$ | $6.41013 \times 10^{-23}$ | − |

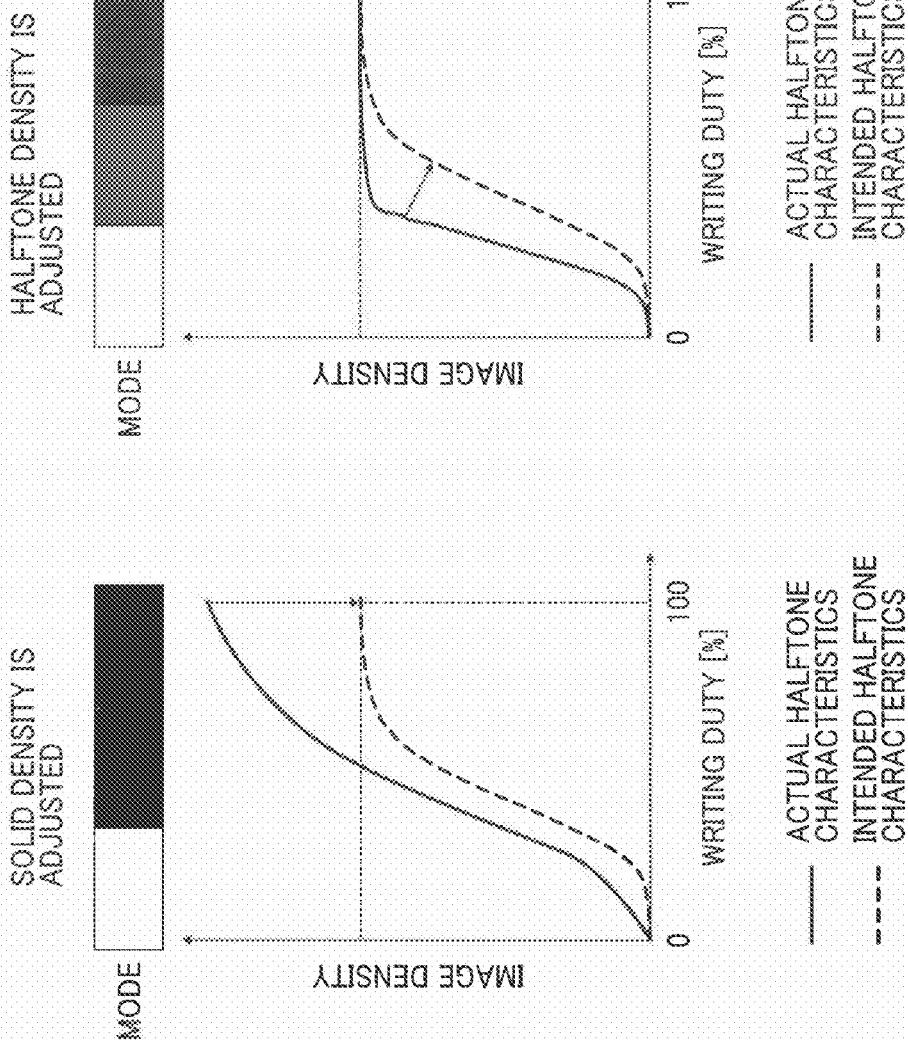

LIGHT SOURCE DEVICE, OPTICAL SCANNING DEVICE, AND IMAGE FORMING APPARATUS

CROSS-REFERENCE TO RELATED APPLICATIONS

The present application claims priority to and incorporates by reference the entire contents of Japanese Patent Application No. 2009-282442 filed in Japan on Dec. 14, 2009. The present document incorporates by reference the entire contents of Japanese application, 2008-328899 filed in Japan on Dec. 25, 2008.

BACKGROUND OF THE INVENTION

1. Field of the Invention

The present invention relates to a light source device, an optical scanning device, and an image forming apparatus.

2. Description of the Related Art

An optical scanning device used for an image forming apparatus such as an optical printer, a digital copier, and an optical plotter scans a surface to be scanned with light modulated according to image information and forms a latent image according to the image information on the surface. The optical scanning device drives a light source using a modulated signal pulse-modulated according to image information in order to output light modulated according to the image information.

Typically, a semiconductor laser is used as the light source, and an edge emitting semiconductor laser (hereinafter, also referred to as an "edge emitting laser") that outputs light in a direction parallel to a substrate has been dominant. However, in recent years, a vertical cavity surface emitting laser (VCSEL) comes on the market. The VCSEL has characteristics of (1) low costs, (2) low electrical power consumption, (3) small size and high performance, and (4) easy two-dimensional integration as compared with the edge emitting laser.

Semiconductor lasers have characteristics such as droop characteristics, rising characteristics, and falling characteristics, in which the light amount changes over time. Such characteristics are known to be derived from the change of threshold current due to heat of an element itself generated by applying current, and from the CR time constant of an electric circuit. These characteristics may cause difference in the image density or may cause an image defect such as density unevenness and color unevenness. For example, Japanese Patent Application Laid-open No. 2006-91157, Japanese Patent Application Laid-open No. 2005-156933, and Japanese Patent Application Laid-open No. 2006-259098 disclose a method for controlling the characteristics. In the method, an optical scanning device receives, by a detector such as a photodiode, a part of a light beam output from a light source as a monitoring light beam and performs auto power control (APC) for controlling the output level of the light source based on the received result.

Image forming apparatuses require higher image density in order to improve image quality and higher output speed of images in order to improve operability. For example, Japanese Patent Application Laid-open No. 2003-283031 discloses a method for achieving both the higher image density and the higher output speed. In the method, an optical scanning device including a light source having a plurality of light-emitting elements scans a surface to be scanned with a plurality of light beams at a time.

Moreover, for example, Japanese Patent Application Laid-open No. 2006-332142 and Japanese Patent Application Laid-open No. 2008-213246 disclose various measures for solving problems arising from the use of a plurality of light-emitting elements.

In a semiconductor laser, a drastic temperature change in the active layer caused by supplying driving current causes a change in refractive index and thus changes the optical confinement state. Therefore, the divergence angle of a light beam to be output (far field pattern (FFP)) is small immediately after current application and becomes large over time even when the driving current is kept constant.

In an optical scanning device including an optical system in which a light beam is collimated with an aperture member, such change in the divergence angle changes the light amount on the surface to be scanned.

An edge emitting laser typically causes mode hopping (wavelength hopping) during driving for quite a short time. Therefore, when the length of an optical path of a cavity is changed due to heat, or when the gain function of a laser medium is changed due to drastic characteristic fluctuation caused immediately after the application of driving current, a mode jump may occur toward a mode most advantageous to oscillation, that is, a mode with a large gain.

For example, as illustrated in FIG. 25, a mode at a short wavelength side (648.17 nanometers) rises immediately after the application of driving current, and a mode at a long wavelength side becomes predominant in stages (mode hopping), and ultimately, the modes are stabilized to become one mode. In FIG. 25, the interval between the adjacent modes is 0.16 nanometer. In a typical edge emitting laser having a wavelength of 650 nanometers, the interval between the adjacent modes is quite small, e.g., about 0.2 nanometer, and thus, the optical system is hardly affected. In other words, even when the inner state of an edge emitting laser is changed, its optical output is relatively stable.

On the other hand, the cavity length of a VCSEL is only about one wavelength, and therefore, mode hopping does not occur in theory. This is because the wavelengths of the adjacent modes are positioned far apart from the oscillation wavelength and are, for example, half or twice the oscillation wavelength. For example, in a VCSEL having an oscillation wavelength of 780 nanometers, the adjacent mode is 390 nanometers or 1560 nanometers. Accordingly, in the VCSEL, even when its inner state is changed, oscillation is continued in the same mode, and thus, the optical output is changed depending on the change in the inner state. In other words, the change in the inner state changes the light amount on the surface to be scanned.

In recent years, image forming apparatuses are used also for simple printing as an on-demand printing system, and in accordance with this, image forming apparatuses further excellent in image quality are required.

However, it seems to be difficult for conventional electrical driving control methods of a light source for controlling the light amount change on a surface to be scanned to correspond to further improvement of image quality demanded in the future.

Typical optical scanning devices and image forming apparatuses are required to have light sources whose optical output ranges are wide to some extent because of the following reasons.

Reason 1: The fluctuation occurs in light use efficiency due to production errors of optical elements.

Reason 2: Production errors of photosensitive elements, toner, developing agents, and similar elements occur.

Reason 3: Image density needs to be adjusted according to environmental changes and aged deterioration.

When the optical output range of the light sources is narrow, the following disadvantages occur.

Disadvantage 1: Costs increase because the production accuracy of optical elements needs to be improved.

Disadvantage 2: Costs increase because a screening process is required in order to decrease the fluctuation of photosensitive elements, toner, developing agents, and similar elements.

Disadvantage 3: Image quality deteriorates because image density cannot be adjusted sufficiently.

Among the three disadvantages, the disadvantage 3 cannot be overcome even if the cost increase is accepted, and therefore, the only measure for obtaining images with high quality is to ensure a wide optical output range.

However, when a VCSEL is used within a wide optical output range, fluctuation due to the unstable state of the light amount at start-up may occur. This fluctuation is a peculiar phenomenon to VCSELs.

Image density adjustment is described below.

In an image forming apparatus such as a copier and a laser beam printer that employ electrophotography, image density control for adjusting image density so as to always obtain intended image density is in practical use. The control is performed at a predetermined timing (when power is tuned on, every predetermined time, or every predetermined numbers of sheets) by exposing a photosensitive element to light while latent image electrostatic potential is changed, forming a latent image on the photosensitive element, and detecting toner density of a toner image obtained by visualizing the latent image with toner by an optical density sensor.

The typical image density control detects a change in characteristics of latent image electrostatic potential relative to the exposed amount of a photosensitive element, feeds back the detected result, and sets optimal charge potential and optical output from a light source.

Disadvantages when image density control is performed while optical output is kept constant are described below.

FIG. 26A illustrates a halftone characteristic prior to adjustment. Development potential (charging-developing bias) is adjusted in order to obtain desired solid density (density when writing duty is 100 percent). Typically, pulse width modulation (PWM) is used for obtaining halftone density.

FIG. 26B illustrates a halftone characteristic after development potential is adjusted. Although the solid density can be adjusted, the halftone density has not yet reached intended density, and halftone reproducibility is low.

FIG. 26C illustrates a halftone characteristic after laser diode (LD) power control is performed on the image of FIG. 26B. An intended halftone characteristic can be obtained.

In other words, when the optical output range of a light source cannot be adjusted, the adjustment is performed only to the level of the image in FIG. 26B. As a result, a halftone characteristic deteriorates, thereby deteriorating image quality.

SUMMARY OF THE INVENTION

It is an object of the present invention to at least partially solve the problems in the conventional technology.

According to an aspect of the present invention, there is provided a light source device that includes a surface emitting laser; a coupling optical system that couples a light beam output from the surface emitting laser; and an aperture member having an aperture that regulates the light beam from the coupling optical system. In the light source device, relationship of $|(Pap1-Pap2)/Pap2|<|(P1-P2)/P2|$ is satisfied, where P2 is a light intensity of the light beam entering the aperture member at a time t2 when 2 microseconds have passed since current was applied to the surface emitting laser, P1 is a light intensity of the light beam entering the aperture member at a time t1 when 40 nanoseconds have passed since a light intensity of the light beam entering the aperture member reached 0.1 time the light intensity P2 at the time t2, Pap2 is a light intensity of the light beam output from the aperture member at the time t2, and Pap1 is a light intensity of the light beam output from the aperture member at a time t1' when 40 nanoseconds have passed since a light intensity of the light beam output from the aperture member reached 0.1 time the light intensity Pap2 at the time t2.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 20 is a table for explaining the optical surface shape of a scanning lens of a deflector side illustrated in FIG. 2;

FIG. 21 is a table for explaining the optical surface shape of a scanning lens of an image surface side illustrated in FIG. 2;

FIGS. 26A to 26C are graphs for explaining disadvantages when image density is controlled while the optical output is kept constant.

DETAILED DESCRIPTION OF THE PREFERRED EMBODIMENTS

Figure 1:
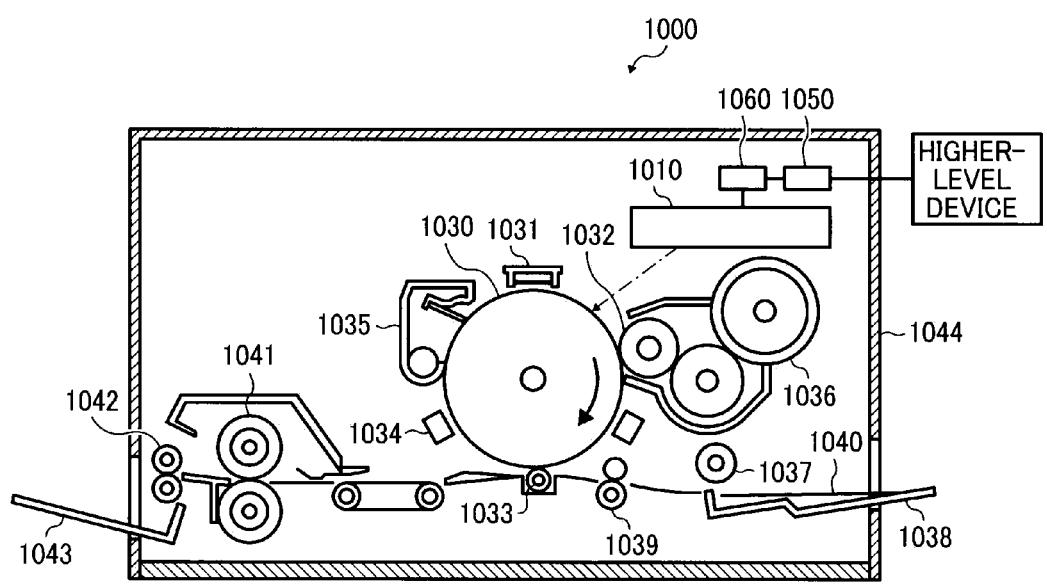
FIG. 1 is a schematic diagram for explaining a laser printer according to an embodiment of the present invention.

Preferred embodiments of the present invention is described below with reference to FIGS. 1 to 23. FIG. 1 is a schematic diagram of a laser printer 1000 serving as an image forming apparatus according to an embodiment of the present invention.

The laser printer 1000 includes an optical scanning device 1010, a photosensitive drum 1030, an electric charger 1031, a developing roller 1032, a transfer charger 1033, a neutralization unit 1034, a cleaning unit 1035, a toner cartridge 1036, a feeding roller 1037, a paper feed tray 1038, a pair of registration rollers 1039, a fixing roller 1041, a discharging roller 1042, a discharge tray 1043, a communication control device 1050, and a printer control device 1060 that collectively controls each of the units described above. These are housed in a printer housing 1044 at predetermined positions.

The communication control device 1050 controls two-way communication between the laser printer 1000 and a higher-level device (a personal computer, for example) via a network or the like.

The photosensitive drum 1030 is a cylindrical member and has a photosensitive layer formed on the surface thereof. In other words, the surface of the photosensitive drum 1030 is a surface to be scanned. The photosensitive drum 1030 rotates in an arrow direction illustrated in FIG. 1.

The electric charger 1031, the developing roller 1032, the transfer charger 1033, the neutralization unit 1034, and the cleaning unit 1035 are arranged near the surface of the photosensitive drum 1030. The electric charger 1031, the developing roller 1032, the transfer charger 1033, the neutralization unit 1034, and the cleaning unit 1035 are arranged in this order along the rotation direction of the photosensitive drum 1030.

The electric charger 1031 uniformly charges the surface of the photosensitive drum 1030.

The optical scanning device 1010 irradiates the surface of the photosensitive drum 1030 charged by the electric charger 1031 with a light beam modulated based on image information received from the upper-level device. As a result, a latent image corresponding to the image information is formed on the surface of the photosensitive drum 1030. The latent image formed in this process moves in a direction of the developing roller 1032 according to the rotation of the photosensitive drum 1030. The structure of the optical scanning device 1010 is described later.

Toner is stored in the toner cartridge 1036 and is supplied to the developing roller 1032.

The developing roller 1032 makes the toner supplied from the toner cartridge 1036 adhere to the latent image formed on the surface of the photosensitive drum 1030 to visualize the image information. The latent image to which the toner is adhered (hereinafter, also referred to as a "toner image" for convenience) moves in a direction of the transfer charger 1033 according to the rotation of the photosensitive drum 1030.

The paper feed tray 1038 stores therein a recording sheet 1040. The feeding roller 1037 is arranged near the paper feed tray 1038, takes out the recording sheet 1040 from the paper feed tray 1038 one by one, and conveys the sheet to the pair of registration rollers 1039. The pair of registration rollers 1039 once holds the recording sheet 1040 taken out by the feeding roller 1037 and sends out the recording sheet 1040 into the gap between the photosensitive drum 1030 and the transfer charger 1033 according to the rotation of the photosensitive drum 1030.

Voltage having a polarity opposite to that of the toner is applied to the transfer charger 1033 in order to electrically attract the toner on the surface of the photosensitive drum 1030 to the recording sheet 1040. The toner image on the surface of the photosensitive drum 1030 is transferred onto the recording sheet 1040 with this voltage. The recording sheet 1040 transferred in this process is sent to the fixing roller 1041.

The fixing roller 1041 applies heat and pressure onto the recording sheet 1040, and thus, the toner is fixed on the recording sheet 1040. The recording sheet 1040 fixed in this process is sent to the discharge tray 1043 via the discharging roller 1042 and is sequentially stacked on the discharge tray 1043.

The neutralization unit 1034 neutralizes the surface of the photosensitive drum 1030.

The cleaning unit 1035 removes the toner (residual toner) remaining on the surface of the photosensitive drum 1030. The surface of the photosensitive drum 1030 from which the residual toner is removed returns to a position facing the electric charger 1031 again.

The structure of the optical scanning device 1010 is described below.

Figure 2:
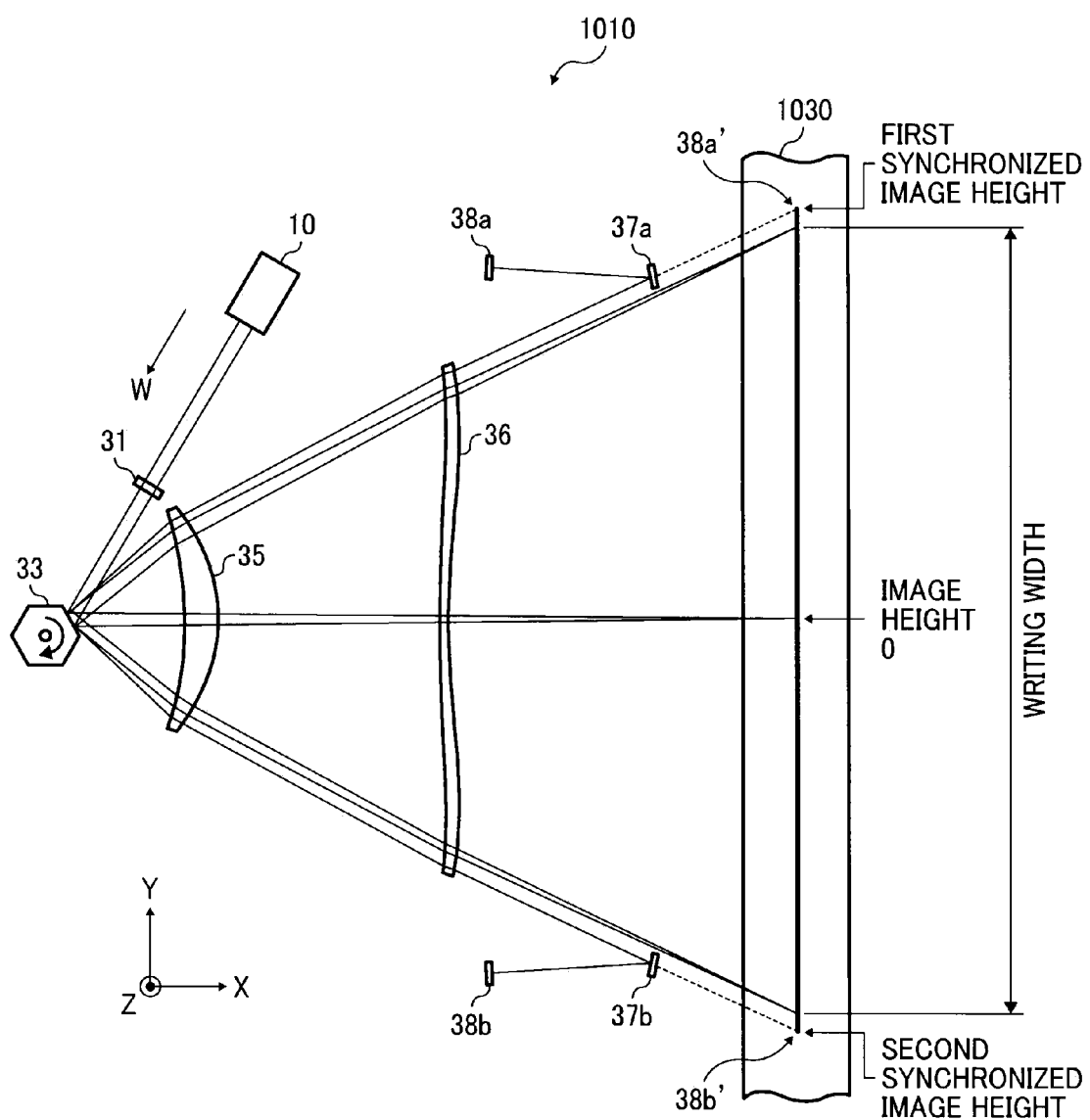
FIG. 2 is a schematic diagram of an optical scanning device illustrated in FIG. 1.

As illustrated in FIG. 2 as one example, the optical scanning device 1010 includes a light source device 10, a cylindrical lens 31, a polygon mirror 33, a scanning lens 35 of deflector side, a scanning lens 36 of image surface side, two photodetection mirrors 37a and 37b, and two photodetection sensors 38a and 38b. These are assembled in a housing (not illustrated) at predetermined positions.

The present specification describes, in an XYZ-three dimensional rectangular coordinate system, a direction along the longitudinal direction of the photosensitive drum 1030 as a Y-axis direction and a direction along the optical axis of each of the scanning lenses 35 and 36 as an X-axis direction. The traveling direction of the light beam directing to the polygon mirror 33 from the light source device 10 is described as a "W direction" hereinafter for convenience.

The direction corresponding to the main-scanning direction is abbreviated as a "main-scanning corresponding direction", and the direction corresponding to the sub-scanning direction is abbreviated as a "sub-scanning corresponding direction" hereinafter for convenience.

A reference numeral 38a' in FIG. 2 indicates a position of the photodetection sensor 38a with the assumption that the photodetection mirror 37a is not provided. This position is called a "first synchronized image height". Similarly, a reference numeral 38b' in FIG. 2 indicates a position of the photodetection sensor 38b with the assumption that the photodetection mirror 37b is not provided. This position is called a "second synchronized image height".

Figure 3:
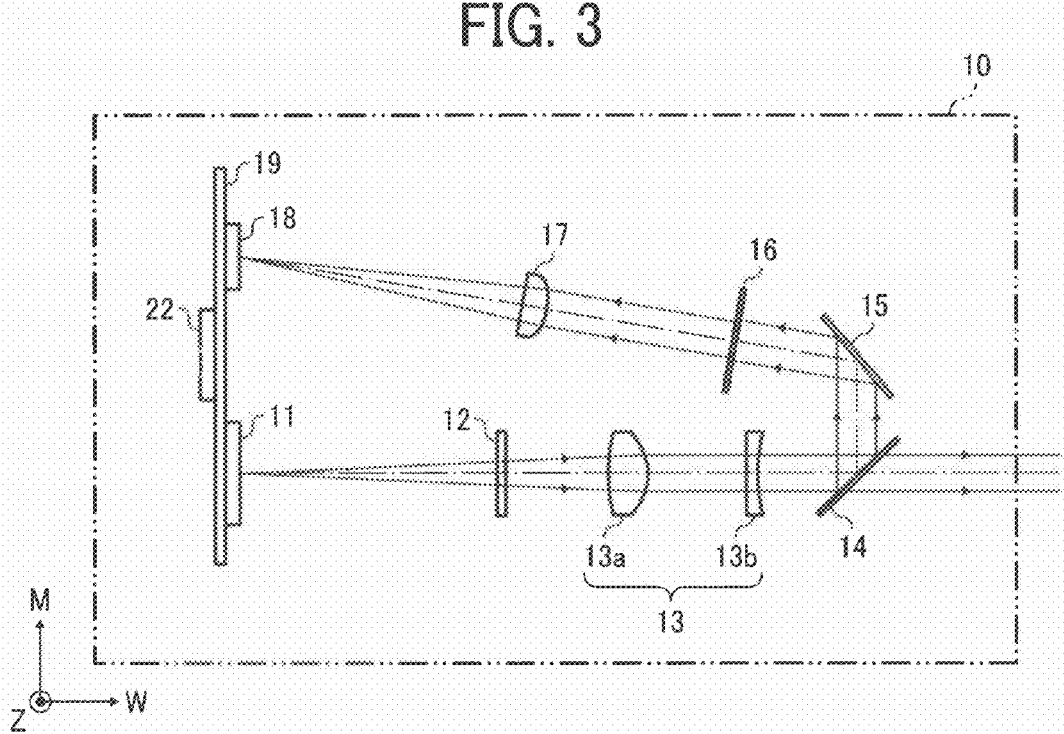
FIG. 3 is a schematic diagram for explaining a light source device illustrated in FIG. 2.

As illustrated in FIG. 3 as one example, the light source device 10 includes a light source 11, a quarter-wave plate 12, a coupling optical system 13, a first aperture plate 14, a monitor light reflecting mirror 15, a second aperture plate 16, a condensing lens 17, a photoreceptor 18, and a light source control device 22. The light source 11, the photoreceptor 18, and the light source control device 22 are mounted on a single control board 19. An "M direction" illustrated in FIG. 3 is a main-scanning corresponding direction in the light source device 10.

Figure 4:
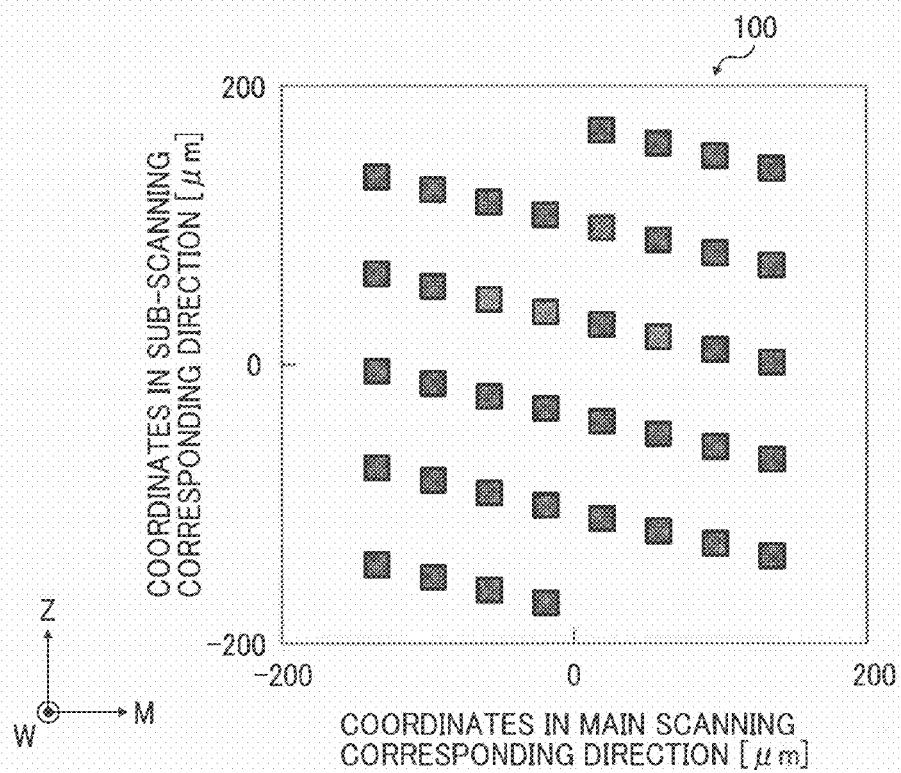
FIG. 4 is a diagram for explaining a two-dimensional array included in a light source illustrated in FIG. 3.

As illustrated in FIG. 4 as one example, the light source 11 includes a two-dimensional array 100 that is formed on a board and in which forty light-emitting elements are two-dimensionally arrayed.

These forty light-emitting elements are arrayed so as to be spaced uniformly when all of the light-emitting elements are orthographically projected on virtual lines extending in a sub-scanning corresponding direction (direction same as a Z-axis direction in this case). In the present specification, a "light-emitting element interval" means a distance between the centers of two light-emitting elements.

Each of the light-emitting elements is a vertical cavity surface emitting laser having an oscillation wavelength of a 780-nanometer band. In other words, the two-dimensional array 100 is a surface emitting laser array including forty light-emitting elements.

The polarized state of a light beam output from each light-emitting element is linearly polarized light whose polarization direction is parallel to the sub-scanning corresponding direction. The divergence angle (FFP) in the stationary state of a light beam output from each light-emitting element (in the state where the optical output is stable) is 7 degrees in any of the main-scanning corresponding direction and the sub-scanning corresponding direction.

Thr light source 11 is arranged so that the light beam is output in a +W direction.

Referring back to FIG. 3, the quarter-wave plate 12 is arranged in the +W direction with respect to the light source 11 and converts the polarized state of a light beam output from the light source 11 into circularly polarized light. This conversion can lower the image height dependence (so-called shading) of the light amount of light beams emitted onto the surface of the photosensitive drum 1030.

The coupling optical system 13 makes the light beams passed through the quarter-wave plate 12 be substantially parallel light. The coupling optical system 13 has the function of suppressing the change of the beam waist position when the ambient temperature is changed. Therefore, the spot diameter of a light spot on the surface of the photosensitive drum 1030 can be stabilized. The spot diameter is 55 micrometers in the main-scanning direction and 55 micrometers in the sub-scanning direction.

The coupling optical system 13 includes a first coupling lens 13a and a second coupling lens 13b.

The first coupling lens 13a is arranged in the +W direction with respect to the quarter-wave plate 12, and light beams passed through the quarter-wave plate 12 enter the first coupling lens 13a. The first coupling lens 13a is a lens made of glass in this embodiment. The focal length of the first coupling lens 13a is 41.34 millimeters. The thickness (material thickness) (a reference numeral D3 in FIG. 19) of the first coupling lens 13a at the center is 5 millimeters.

The second coupling lens 13b is arranged in the +W direction with respect to the first coupling lens 13a, and light beams passed through the first coupling lens 13a enter the second coupling lens 13b. The second coupling lens 13b is a lens made of resin in this embodiment. The focal length of the second coupling lens 13b is −350.6 millimeters. The thickness (material thickness) (a reference numeral D5 in FIG. 19) of the second coupling lens 13b at the center is 2 millimeters.

Each of the positions of the first coupling lens 13a and the second coupling lens 13b is adjusted so as to reduce the influence of installation errors and processing errors (production errors) of the other optical elements.

The distance (a reference numeral D4 in FIG. 19) between the emitting surface of the first coupling lens 13a and the incident surface of the second coupling lens 13b is 12 millimeters in this embodiment. The combined focal length of the first coupling lens 13a and the second coupling lens 13b is 45 millimeters.

Figure 5:
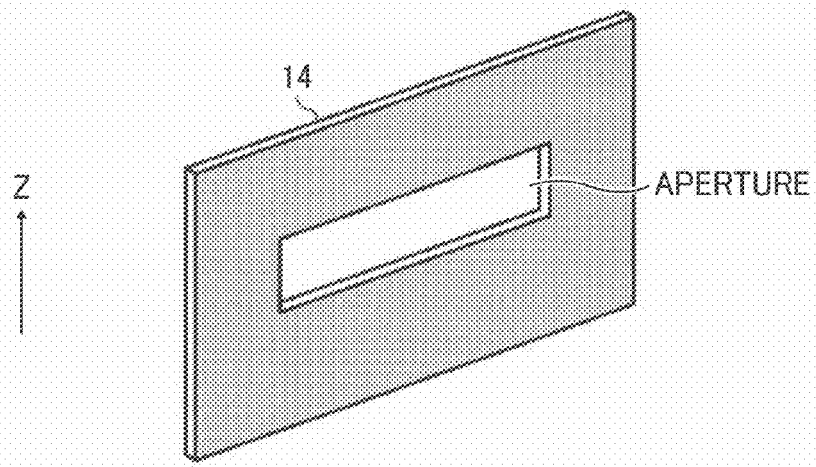
FIG. 5 is a schematic diagram for explaining a first aperture plate illustrated in FIG. 3.

As illustrated in FIG. 5 as one example, the first aperture plate 14 has an aperture and shapes light beams passed through the coupling optical system 13. In this embodiment, the first aperture plate 14 is arranged so that the portion of the light beams passed through the coupling optical system 13 where the light intensity is the largest passes through substantially the center of the aperture. The periphery of the aperture of the first aperture plate 14 is made of a reflective member having high reflectivity.

The first aperture plate 14 is arranged so as to be inclined with respect to a virtual plane orthogonal to the optical axis of the coupling optical system 13 in order to utilize the light beam reflected from the reflective member at the periphery of the aperture as a monitoring light beam.

Figure 6:
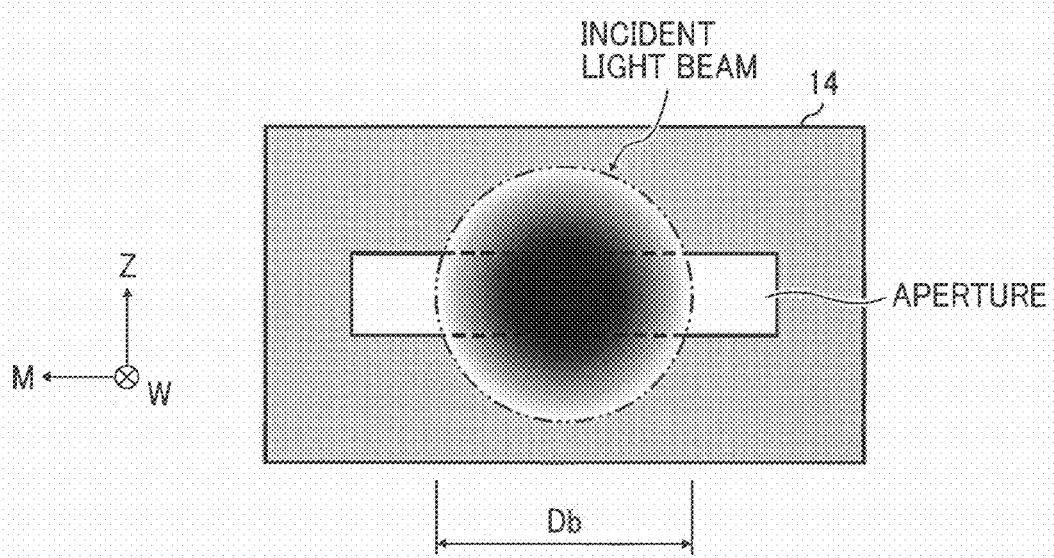
FIG. 6 is a schematic diagram for explaining relationship between the aperture of the first aperture and a beam diameter.

As illustrated in FIG. 6 as one example, the length (width) of the aperture of the first aperture plate 14 in the main-scanning corresponding direction (the M direction in this embodiment) is equal to or larger than a beam diameter Db of light beams entering the first aperture plate 14. The length (width) of the aperture of the first aperture plate 14 in the sub-scanning corresponding direction (same as the Z-axis direction in this embodiment) is set so as to be smaller than the beam diameter Db.

In the present embodiment, the beam diameter of the light beam means a diameter (full width at half maximum (FWHM)) where a light intensity is equal to or more than ½ of the central light intensity of the light beam.

Figure 7A:
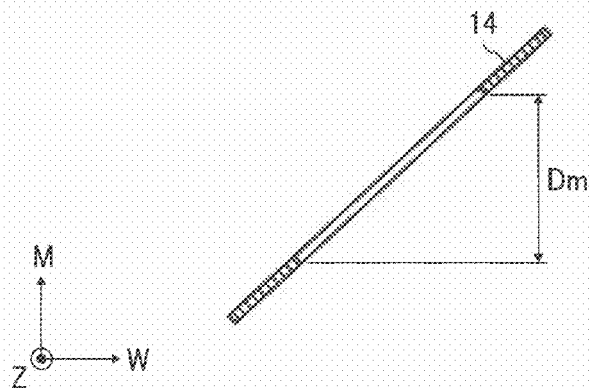
FIGS. 7A and 7B are schematic diagrams for explaining the width of the aperture of the first aperture plate.
Figure 7B:
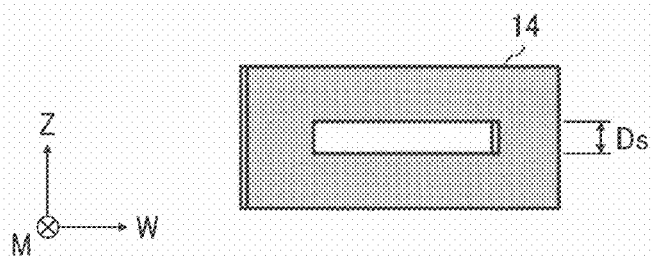

As illustrated in FIG. 7A, a length (width) Dm of the aperture of the first aperture plate 14 in the main-scanning corresponding direction is 5.6 millimeters. As illustrated in FIG. 7B, a length (width) Ds of the aperture of the first aperture plate 14 in the sub-scanning corresponding direction is 1.18 millimeters. FIG. 7A is a cross-sectional schematic diagram of the first aperture plate 14 cut with a plane that passes through the center of the aperture and is orthogonal to the Z-axis direction.

The light beams passed through the aperture of the first aperture plate 14 mean light beams output from the light source device 10.

Figure 8:
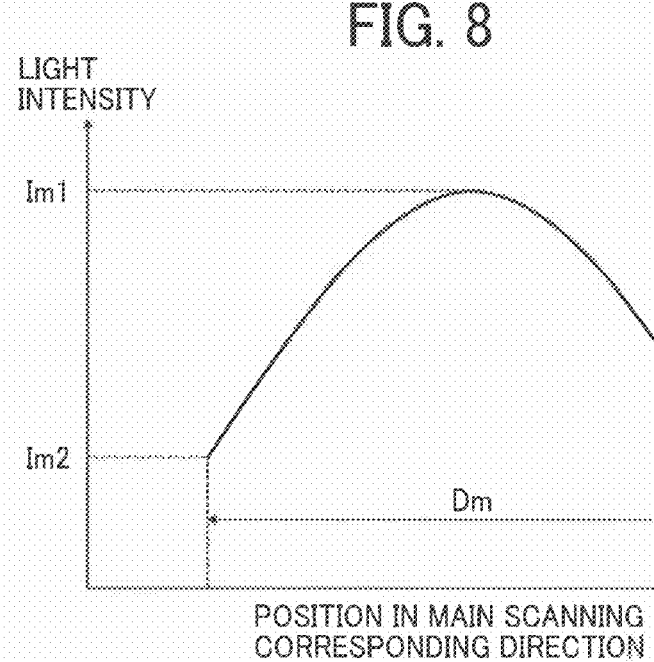
FIG. 8 is a graph for explaining, in spacial light intensity distribution of light beams passed through the aperture of the first aperture plate, spacial light intensity distribution of the light beam passed through the center of the aperture in a direction parallel to the main-scanning corresponding direction.

FIG. 8 is a graph of, in spacial light intensity distribution of light beams passed through the aperture of the first aperture plate 14, spacial light intensity distribution of the light beams passed through the center of the aperture in a direction parallel to the main-scanning corresponding direction. In FIG. 8, the lowest value Im2 of the light intensity is equal to or less than 0.5 time the highest value Im1 of the light intensity. That is, "lowest value of light intensity/largest value of light intensity"≤0.5.

Figure 9:
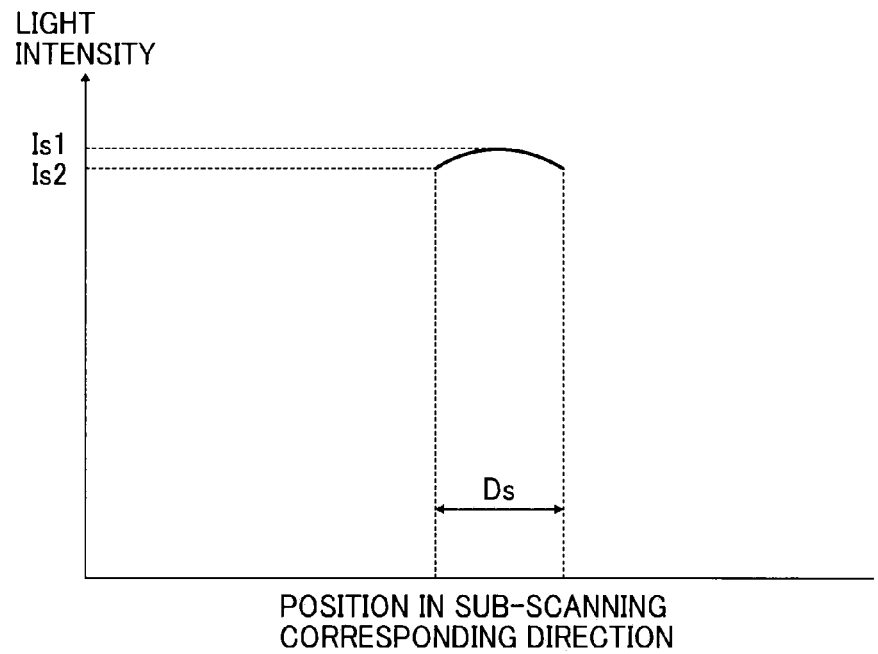
FIG. 9 is a graph for explaining, in spacial light intensity distribution of a light beam passed through the aperture of the first aperture plate, spacial light intensity distribution of the light beam passed through the center of the aperture in a direction parallel to the sub-scanning corresponding direction.

FIG. 9 is a graph of, in spacial light intensity distribution of light beams passed through the aperture of the first aperture plate 14, spacial light intensity distribution of the light beams passed through the center of the aperture in a direction parallel to the sub-scanning corresponding direction. In FIG. 9, the lowest value Is2 of the light intensity is equal to or more than 0.9 time the highest value Is1 (same as Im1) of the light intensity. That is, "lowest value of light intensity/largest value of light intensity"≥0.9.

The light amount of the light beams condensed on the surface of the photosensitive drum 1030 has an allowable range depending on the photosensitivity of the photosensitive layer.

Figure 10:
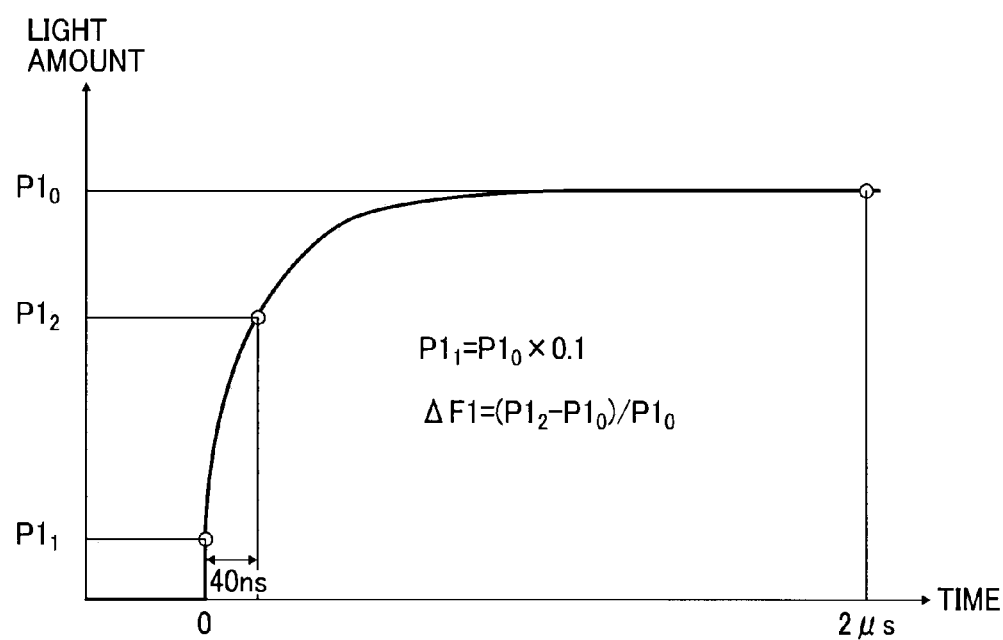
FIG. 10 is a graph for explaining time variation of the light amount of a light beam passed through the aperture of the first aperture plate when a driving signal near the lower limit of an allowable range is supplied.

FIG. 10 indicates time variation of the light amount of light beams passed through the aperture of the first aperture plate 14 when a driving signal near the lower limit of the allowable range is supplied to any of the light-emitting elements of the two-dimensional array 100.

In this case, the light amount monotonically increases to be in a stable state. A light amount change rate $\Delta F1$ at this time is defined by the formula (1) below. $P1_1=P1_0 \times 0.1$ is given, where $P1_0$ is a light amount when the light amount becomes stable after current starts to be supplied (when about 2 microseconds have passed). $P1_2$ is a light amount at a time when 40 nanoseconds have passed from the time of $P1_1$. $P1_2 < P1_0$ is given in this case, and thus, $\Delta F1 < 0$.

$$\Delta F1 = (P1_2 - P1_0)/P1_0 \tag{1}$$

Specifically, $P1_0=40$ (microwatts), $P1_2=35$ (microwatts), and $\Delta F1=-0.125$.

Figure 11:
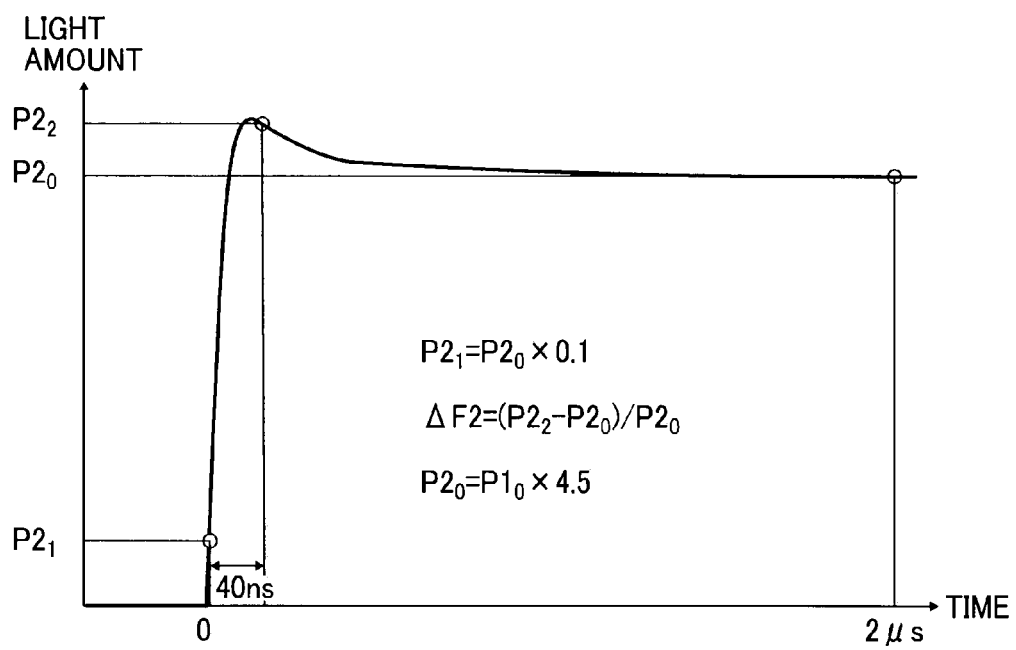
FIG. 11 is a graph for explaining time variation of the light amount of a light beam passed through the aperture of the first aperture plate when a driving signal near the upper limit of an allowable range is supplied.

FIG. 11 indicates time variation of the light amount of light beams passed through the aperture of the first aperture plate 14 when a driving signal near the upper limit of the allowable range is supplied to any of the light-emitting elements of the two-dimensional array 100.

In this case, the light amount is overshot and then becomes a stable state. A light amount change rate $\Delta F2$ at this time is defined by the formula (2) below. $P2_1=P2_0 \times 0.1$ is given, where $P2_0$ is a light amount when the light amount becomes stable after current starts to be supplied (when about 2 microseconds have passed). $P2_2$ is a light amount at a time when 40 nanoseconds have passed from the time of $P2_1$. $P2_2 > P2_0$ is given in this case, and thus, $\Delta F2 > 0$. $P2_0 = P1_0 \times 4.5$ is given at this time.

$$\Delta F2 = (P2_2 - P2_0)/P2_0 \tag{2}$$

Specifically, $P2_0=P1_0 \times 4.5=180$ (microwatts), $P2_2=204$ (microwatts), and $\Delta F2=0.133$.

In the present embodiment, $|\Delta F1| \approx \Delta F2$ is given.

Figure 12:
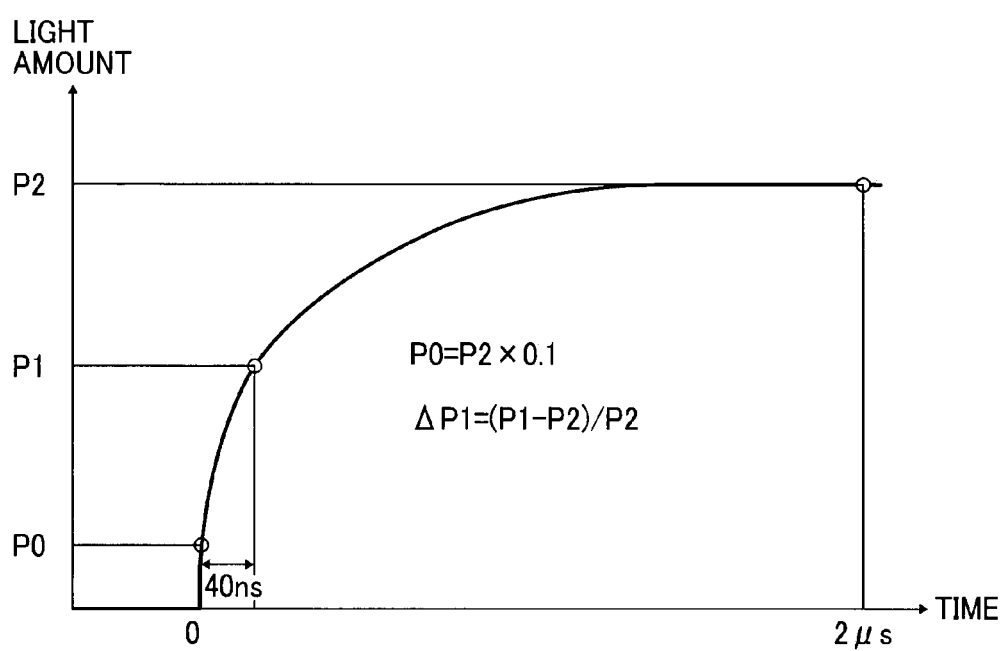
FIG. 12 is a graph for explaining time variation of the light amount of a light beam entering the first aperture plate when a driving signal corresponding to ¼ of the maximum rated output is supplied.

FIG. 12 indicates time variation of the light amount of light beams entering the first aperture plate 14 when a driving signal corresponding to ¼ of the maximum rated output is supplied to any of the light-emitting elements of the two-dimensional array 100.

A light amount change rate $\Delta P1$ in this case is defined by the formula (3) below. $P0=P2 \times 0.1$ is given, where P2 is a light amount when the light amount becomes stable after current starts to be supplied (when about 2 microseconds have passed). P1 is a light amount at a time when 40 nanoseconds have passed from the time of P0.

$$\Delta P1 = (P1 - P2)/P2 \tag{3}$$

Figure 13:
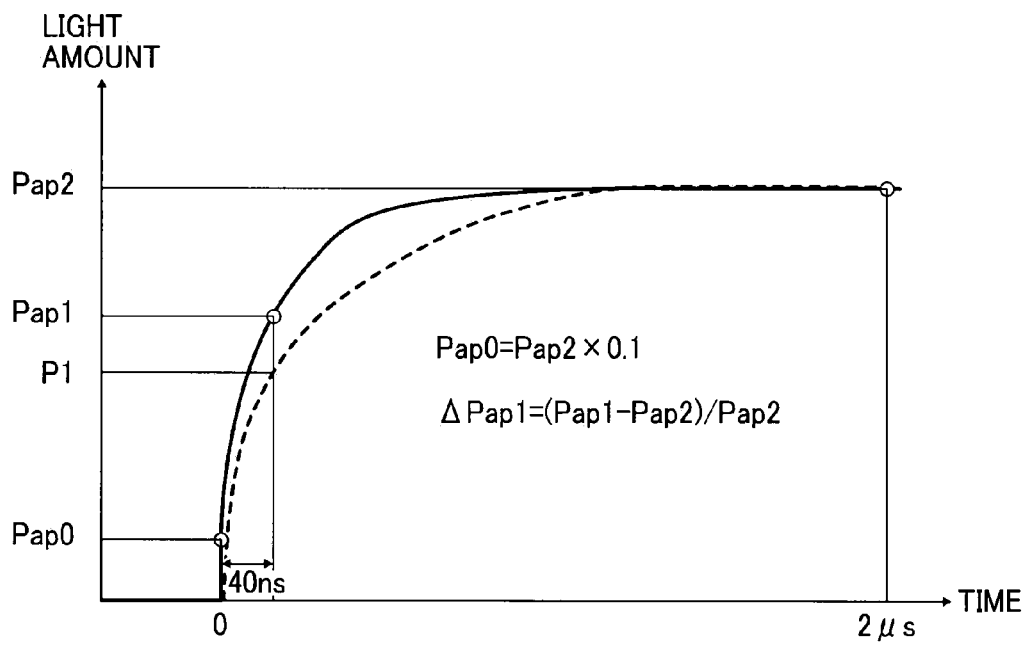
FIG. 13 is a graph for explaining time variation of the light amount of a light beam passed through the aperture of the first aperture plate when a driving signal corresponding to ¼ of the maximum rated output is supplied.

FIG. 13 indicates time variation of the light amount of light beams passed through the aperture of the first aperture plate 14 when a driving signal corresponding to ¼ of the maximum rated output is supplied to any of the light-emitting elements of the two-dimensional array 100.

A light amount change rate $\Delta P2$ in this case is defined by the formula (4) below. $Pap0=Pap2 \times 0.1$ is given, where Pap2 is a light amount when the light amount becomes stable after current starts to be supplied (when about 2 microseconds have passed). Pap1 is a light amount at a time when 40 nanoseconds have passed from the time of Pap0.

$$\Delta Pap1 = (Pap1 - Pap2)/Pap2 \tag{4}$$

In this case, the relationship of $|\Delta Pap1| < |\Delta P1|$ is satisfied. The curve of FIG. 12 that is standardized so as to be P2=Pap2 is added to FIG. 13 as a dashed line.

Figure 14:
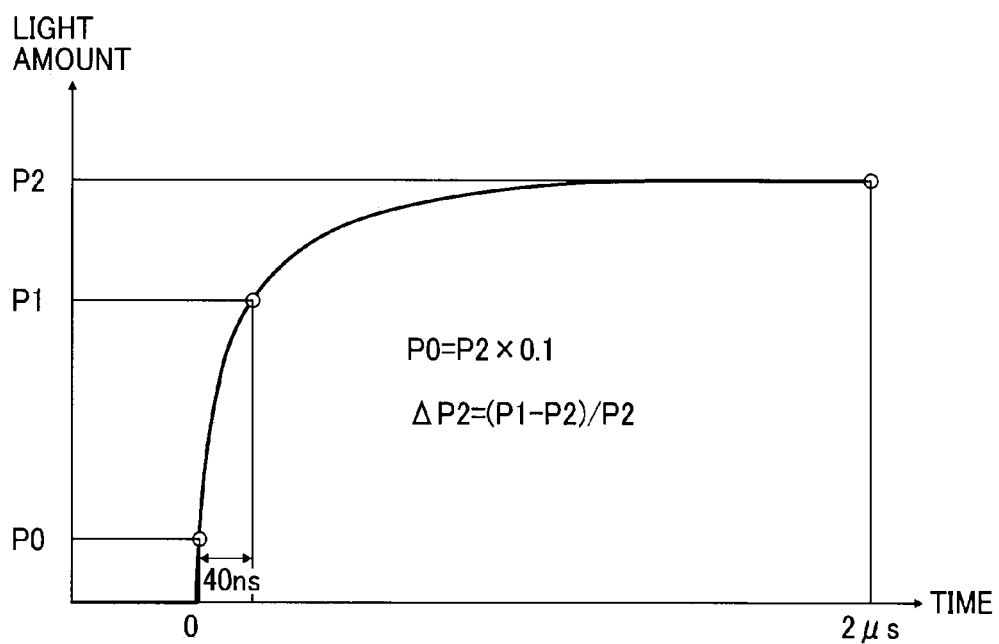
FIG. 14 is a graph for explaining time variation of the light amount of a light beam entering the first aperture plate when a driving signal corresponding to the maximum rated output is supplied.

FIG. 14 indicates time variation of the light amount of light beams entering the first aperture plate 14 when a driving signal corresponding to the maximum rated output is supplied to any of the light-emitting elements of the two-dimensional array 100.

A light amount change rate $\Delta P2$ in this case is defined by the formula (5) below. $P0=P2 \times 0.1$ is given, where P2 is a light amount when the light amount becomes stable after current starts to be supplied (when about 2 microseconds have passed). P1 is a light amount at a time when 40 nanoseconds have passed from the time of P0.

$$\Delta P2 = (P1 - P2)/P2 \tag{5}$$

Figure 15:
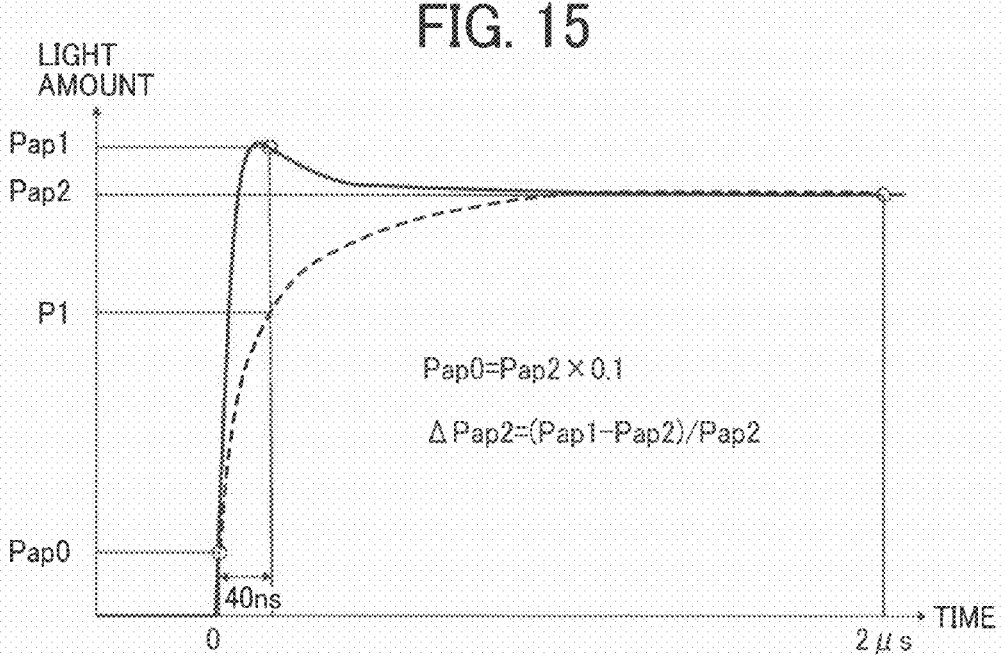
FIG. 15 is a graph for explaining time variation of the light amount of a light beam passed through the aperture of the first aperture plate when a driving signal corresponding to the maximum rated output is supplied.

FIG. 15 indicates time variation of the light amount of light beams passed through the aperture of the first aperture plate 14 when a driving signal corresponding to the maximum rated output is supplied to any of the light-emitting elements of the two-dimensional array 100.

A light amount change rate $\Delta Pap2$ in this case is defined by the formula (6) below. $Pap0=Pap2 \times 0.1$ is given, where Pap2 is a light amount when the light amount becomes stable after current starts to be supplied (when about 2 microseconds have passed). Pap1 is a light amount at a time when 40 nanoseconds have passed from the time of Pap0.

$$\Delta Pap2 = (Pap1 - Pap2)/Pap2 \tag{6}$$

In this case, the relationship of $|\Delta Pap2| < |\Delta P2|$ is satisfied. The curve of FIG. 14 that is standardized so as to be P2=Pap2 is added to FIG. 15 as a dashed line.

The magnitude relationship between Pap1 and Pap2 when the output of the light-emitting element is the maximum rated output is inverse to the magnitude relationship between Pap1 and Pap2 when the output of the light-emitting element is ¼ of the maximum rated output.

Figure 16:
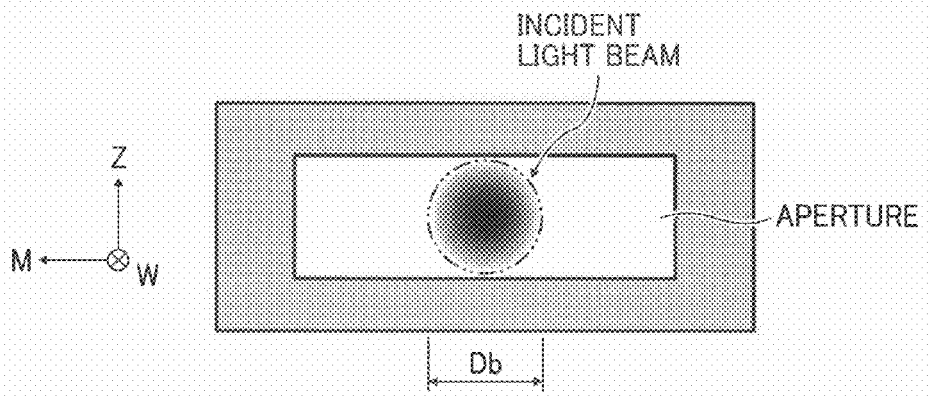
FIG. 16 is a schematic diagram for explaining relationship between an aperture of an aperture plate and a beam diameter in a conventional light source device.

As illustrated in FIG. 16 as one example, in the conventional light source device, the width of the aperture of the aperture plate that light beams passed through the coupling optical system enters is equal to or larger than the beam diameter of incident light beams in any of the main-scanning corresponding direction and the sub-scanning corresponding direction.

Figure 17:
FIG. 17 is a graph for explaining time variation of the light amount of a light beam passed through the aperture of the aperture plate in the conventional light source device when a driving signal near the lower limit of an allowable range is supplied.
Figure 18:
FIG. 18 is a graph for explaining time variation of the light amount of a light beam passed through the aperture of the aperture plate in the conventional light source device when a driving signal near the upper limit of an allowable range is supplied.
Figure 19:
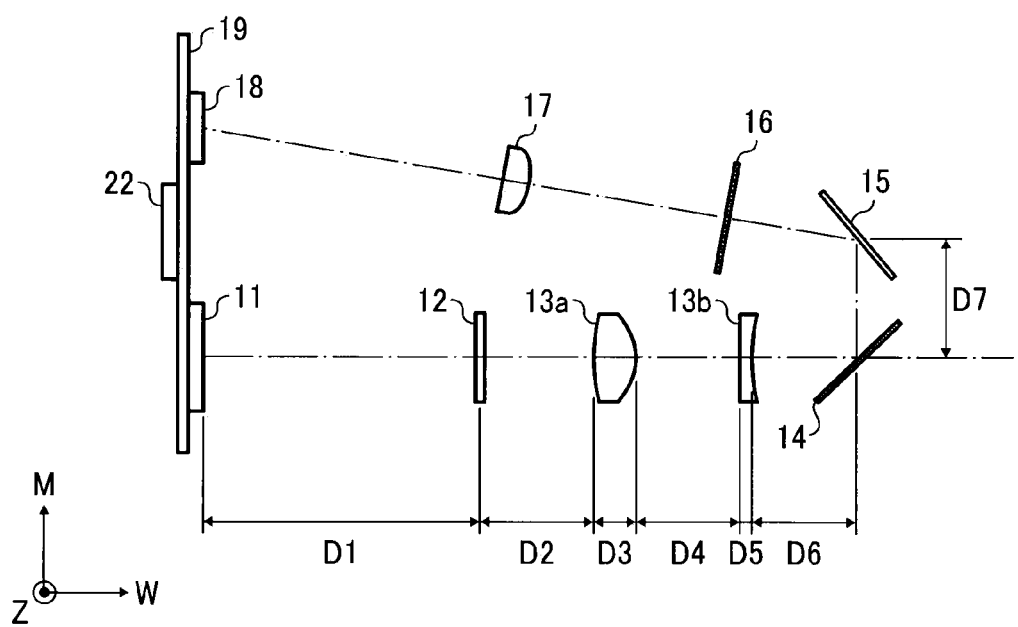
FIG. 19 is a schematic diagram for explaining positional relationship of each element of the light source device.

FIG. 17 indicates time variation of the light amount of light beams passed through the aperture of the aperture plate in the conventional light source device when a driving signal near the lower limit of the allowable range is supplied. FIG. 18 indicates time variation of the light amount of light beams passed through the aperture of the aperture plate in the conventional light source device when a driving signal near the upper limit of the allowable range is supplied. In this case, the light amount of the light beams passed through the aperture of the aperture plate monotonically increases to be in a stable state regardless of the light amount. ΔF1<0, ΔF2<0, and |ΔF1|>|ΔF2| are given. Specifically, ΔF1=−0.26 and ΔF2=−0.21 are given.

When the larger value of |ΔF1| and ΔF2 in the present embodiment is assumed to be ΔFa, and the larger value of |ΔF1| and |ΔF2| in the conventional light source device is assumed to be ΔFb, ΔFa<ΔFb is given. In other words, the present embodiment can reduce fluctuation due to the unstable state of the light amount at start-up when the light amount of light beams passing through the aperture of the first aperture plate 14 is changed within the allowable range as compared with the fluctuation in the conventional device.

Referring back to FIG. 3, the monitor light reflecting mirror 15 reflects the optical path of the light beam (monitoring light beam) reflected from the reflective member of the first aperture plate 14, in a direction toward the photoreceptor 18.

The second aperture plate 16 specifies the beam diameter of the monitoring light beam reflected from the monitor light reflecting mirror 15. The size and the shape of the aperture of the second aperture plate 16 are determined depending on the size and the shape of the aperture of the first aperture plate 14.

The condensing lens 17 condenses the monitoring light beam passed through the aperture of the second aperture plate 16.

The photoreceptor 18 receives the monitoring light beam. The photoreceptor 18 outputs a signal depending on the amount of received light (a photoelectric conversion signal).

The optical system arranged on the optical path for the monitoring light beam at a position between the first aperture plate 14 and the photoreceptor 18 is also called a monitoring optical system. In the present embodiment, the monitoring optical system is constituted by the monitor light reflecting mirror 15, the second aperture plate 16, and the condensing lens 17.

The quarter-wave plate 12, the coupling optical system 13, the first aperture plate 14, the monitor light reflecting mirror 15, the second aperture plate 16, and the condensing lens 17 are held with a holding member (not illustrated) in a predetermined positional relationship.

In the present embodiment, the optical path length (a reference numeral D1 in FIG. 19) between the light source 11 and the quarter-wave plate 12 is 19.50 millimeters, and the optical path length (a reference numeral D2 in FIG. 19) between the quarter-wave plate 12 and the center of the incident surface of the first coupling lens 13a is 23.035 millimeters. The optical path length (a reference numeral D6 in FIG. 19) between the center of the emitting surface of the second coupling lens 13b and the center of the aperture of the first aperture plate 14 is 11.46 millimeters, and the optical path length (a reference numeral D7 in FIG. 19) between the center of the aperture of the first aperture plate 14 and the center of the monitor light reflecting mirror 15 is 14.0 millimeters.

Referring back to FIG. 2, the cylindrical lens 31 makes the light beams passed through the aperture of the first aperture plate 14 of the light source device 10, that is, makes the light beams output from the light source device 10 form into an image near the deflection reflecting surface of the polygon mirror 33 in the Z-axis direction. The cylindrical lens 31 is fixed on the housing of the optical scanning device 1010 after the position in the optical axis direction, the position in the sub-scanning corresponding direction, and the position around the optical axis are adjusted so that the spot diameters and the scanning line intervals of the light spots on the surface of the photosensitive drum 1030 become predetermined values.

The optical system arranged on the optical path at a position between the light source 11 and the polygon mirror 33 is also called a pre-deflector optical system. In the present embodiment, the pre-deflector optical system is constituted by the quarter-wave plate 12, the coupling optical system 13, the first aperture plate 14, and the cylindrical lens 31.

As an example, the polygon mirror 33 includes a six-sided mirror having an inscribed circle radius of 25 millimeters in which each mirror serves as a deflection reflecting surface. The polygon mirror 33 deflects the light beams from the cylindrical lens 31 while rotating at a constant speed around an axis parallel to the Z-axis direction.

The scanning lens 35 of deflector side is arranged on the optical path of the light beam deflected by the polygon mirror 33.

The scanning lens 36 of image surface side is arranged on the optical path of the light beam passed through the scanning lens 35 of deflector side. The light beam passed through the scanning lens 36 of image surface side is emitted on the surface of the photosensitive drum 1030, and a light spot is formed thereon. The light spot moves in the longitudinal direction of the photosensitive drum 1030 according to the rotation of the polygon mirror 33. In other words, the light spot scans the photosensitive drum 1030. In this process, the movement direction of the light spot is a "main-scanning direction". The rotation direction of the photosensitive drum 1030 is a "sub-scanning direction".

The scanning lens of deflector side 35 and the scanning lens 36 of image surface side are both made of resin. Each surface (incident surfaces and emitting surfaces) of them is an aspheric surface represented by the formula (3) and Formula (4) below. In the formulae, X is a coordinate in the X-axis direction, and Y is a coordinate in the Y-axis direction. The center of the incident surface is designated as Y=0. In the formula (3), $C_{m0}$ is a curvature at Y=0 in the main-scanning corresponding direction and is the inverse of a curvature radius $R_{m0}$, and $a_{00}, a_{01}, a_{02}$ and so on are aspheric coefficients in the main-scanning corresponding direction. In the formula (4), Cs(Y) is a curvature of Y in the sub-scanning corresponding direction, $R_{s0}$ is a curvature radius on an optical axis in the sub-scanning corresponding direction, and $b_{00}, b_{01}, b_{02}$ and so on are aspheric coefficients in the sub-scanning corresponding direction. The optical axis means an axis passing through the center point at Y=0 in the sub-scanning corresponding direction.

$$X(Y) = \frac{C_{m0} \cdot Y^2}{1 + \sqrt{1 - (1 + a_{00}) \cdot C_{m0}^2 \cdot Y^2}} + a_{01} \cdot Y + a_{02} \cdot Y^2 + a_{03} \cdot Y^3 + a_{04} \cdot Y^4 + \ldots \quad (3)$$

$$Cs(Y) = \frac{1}{R_{S0}} + b_{01} \cdot Y + b_{02} \cdot Y^2 + b_{03} \cdot Y^3 + \ldots \quad (4)$$

FIG. 20 illustrates an example of $R_{m0}$, $R_{s0}$, and values of the aspheric coefficients of each surface (an incident surface and an emitting surface) of the deflector side-scanning lens 35.

FIG. 21 illustrates an example of $R_{m0}$, $R_{s0}$, and values of the aspheric coefficients of each surface (an incident surface and an emitting surface) of the image surface side-scanning lens 36.

The optical system arranged on the optical path at a position between the polygon mirror 33 and the photosensitive drum 1030 is also called a scanning optical system. In the present embodiment, the scanning optical system is constituted by the deflector side-scanning lens 35 and the image surface side-scanning lens 36. At least one reflecting mirror may be arranged on at least one of the optical path between the scanning lens 35 of deflector side and the scanning lens 36 of image surface side and the optical path between the scanning lens 36 of image surface side and the photosensitive drum 1030.

Figure 22:
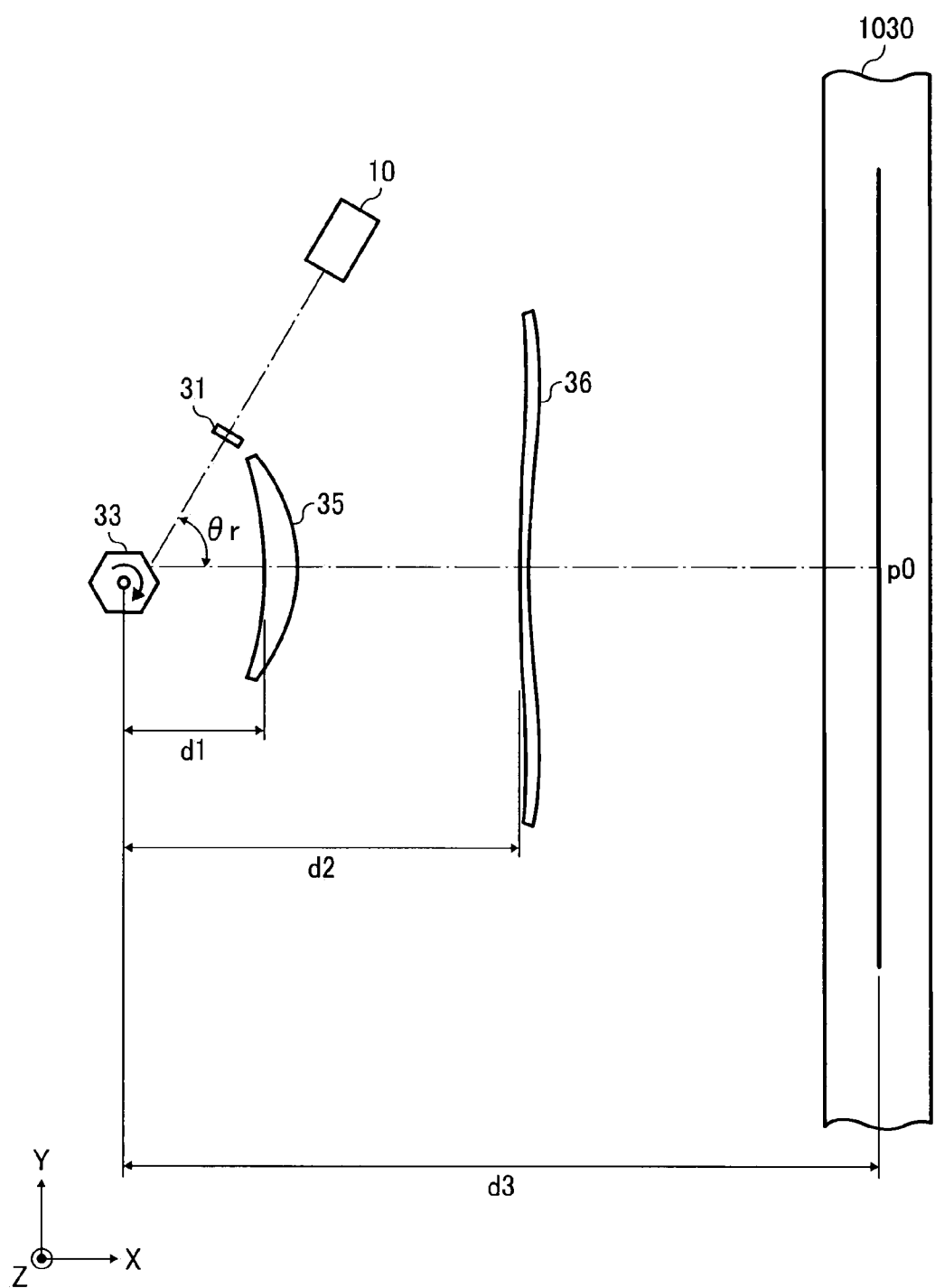
FIG. 22 is a schematic diagram for explaining positional relationship of a polygon mirror, a scanning optical system, and a surface to be scanned that are illustrated in FIG. 2.

FIG. 22 indicates a positional relationship of the polygon mirror 33, the scanning optical system, and a surface to be scanned. In FIG. 22, the optical path length (a reference numeral d1 in FIG. 22) between the rotation center of the polygon mirror 33 and the center of the incident surface of the scanning lens 35 of deflector side is 68.63 millimeters. The optical path length (a reference numeral d2 in FIG. 22) between the rotation center of the polygon mirror 33 and the center of the incident surface of the scanning lens 36 of image surface side is 171.97 millimeters. The optical path length (a reference numeral d3 in FIG. 22) between the rotation center of the polygon mirror 33 and the surface to be scanned is 319.39 millimeters.

The angle (a reference numeral θr in FIG. 22) between a direction parallel to the optical axis of the cylindrical lens 31 and the traveling direction of the light beam reflected by the deflection reflecting surface of the polygon mirror 33 toward the position of an image height of 0 (position of a reference numeral p0 in FIG. 22) on the surface of the photosensitive drum 1030 is 64 degrees.

A writing width (see FIG. 2) on the surface of the photosensitive drum 1030 in the main-scanning direction is 328 millimeters.

Referring back to FIG. 2, a part of the light beams before writing starts among the light beams that have been deflected by the polygon mirror 33 and have passed through the scanning optical system enters the photodetection sensor 38a via the photodetection mirror 37a. A part of the light beams after writing is finished among the light beams that have been deflected by the polygon mirror 33 and have passed through the scanning optical system enters the photodetection sensor 38b via the photodetection mirror 37b.

Each of the photodetection sensors outputs a signal depending on the amount of received light (a photoelectric conversion signal).

In FIG. 2, the distance between the first synchronized image height and the second synchronized image height is 354 millimeters.

Figure 23:
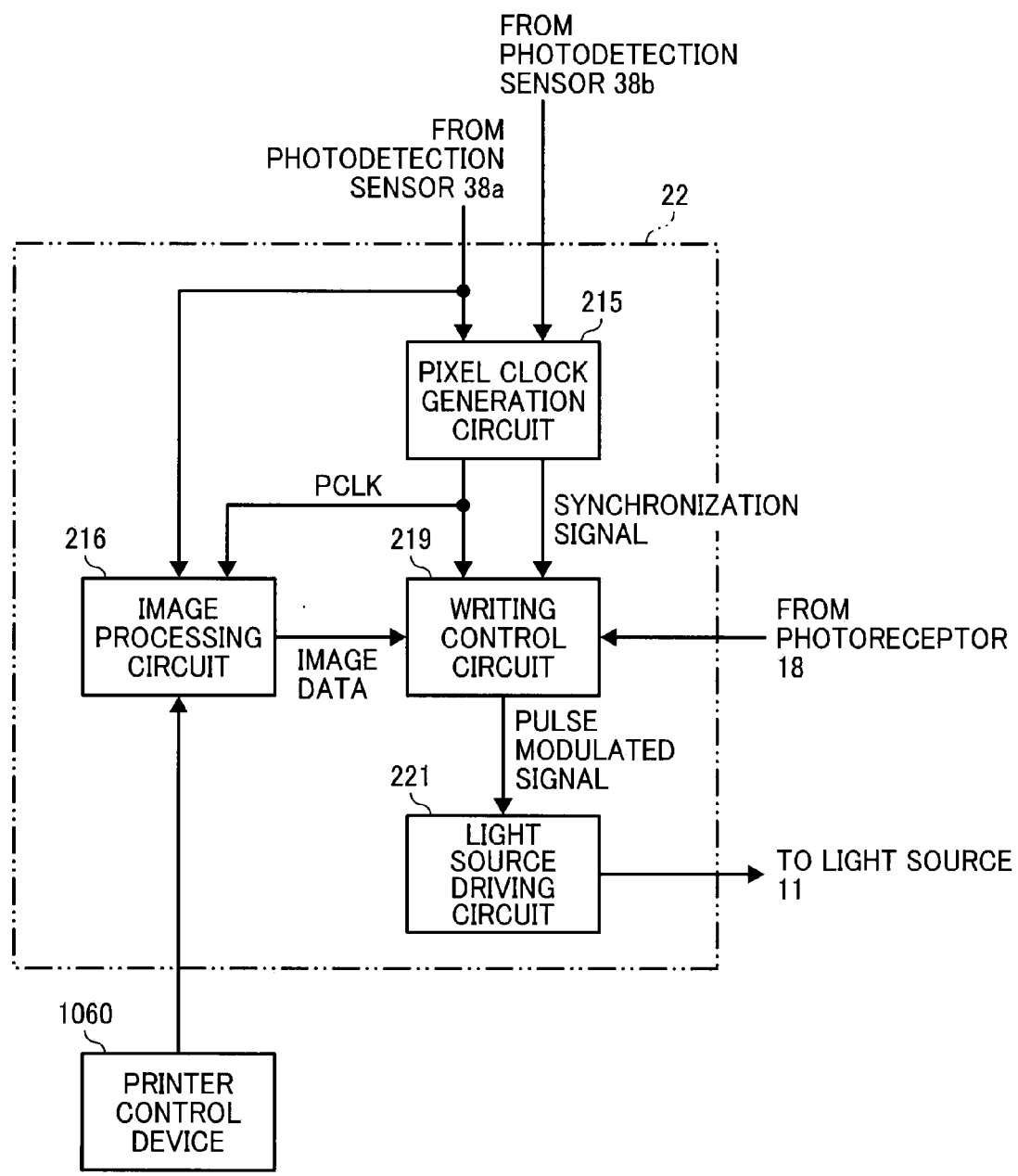
FIG. 23 is a block diagram for explaining a structure of a light source control device illustrated in FIG. 3.

As illustrated in FIG. 23 as one example, the light source control device 22 includes a pixel clock generation circuit 215, an image processing circuit 216, a writing control circuit 219, and a light source driving circuit 221. Arrows illustrated in FIG. 23 indicate representative signals or information flow and do not indicate the whole connection relationship of each block.

The pixel clock generation circuit 215 determines a time required for a light beam to scan between the photodetection sensors using an output signal of the photodetection sensor 38a and an output signal of the photodetection sensor 38b, sets a frequency so that a preset number of pulses is placed within the time, and thus generates a pixel clock signal PCLK of the frequency. Thus generated pixel clock signal PCLK is supplied to the image processing circuit 216 and the writing control circuit 219. The output signal of the photodetection sensor 38a is output to the writing control circuit 219 as a synchronization signal.

The image processing circuit 216 subjects image information received from the upper-level device via the printer control device 1060 to raster development, subjects the information to predetermined halftone processing and similar processing, and then produces image data representing tone of each image by each light-emitting element based on the pixel clock signal PCLK. The image processing circuit 216 detects the start of scanning based on the output signal of the photodetection sensor 38a and then outputs the image data to the writing control circuit 219 in synchronization with the pixel clock signal PCLK.

The writing control circuit 219 generates a pulse modulated signal based on the image data output from the image processing circuit 216, the pixel clock signal PCLK and the synchronization signal output from the pixel clock generation circuit 215. The writing control circuit 219 corrects the driving current of each light-emitting element at a predetermined timing based on the output signal of the photoreceptor 18 so that the light amount of the optical beam passing through the aperture of the first aperture plate 14 of the light source device 10 becomes a predetermined value. In other words, the writing control circuit 219 performs auto power control (APC).

The light source driving circuit 221 drives each light-emitting element of the two-dimensional array 100 based on the pulse modulated signal from the writing control circuit 219.

As is apparent from the description, in the light source device 10 according to the present embodiment, the coupling optical system is constituted by the first coupling lens 13a and the second coupling lens 13b, and the aperture member includes the first aperture plate 14.

As described above, the light source device 10 according to the present embodiment includes: the light source 11 including a surface emitting laser array in which a plurality of light-emitting elements is two-dimensionally arrayed; the coupling optical system 13 that couples a light beams output from the light source 11; the first aperture plate 14 that the light beam passed through the coupling optical system 13 enters, that has an aperture whose aperture width in the sub-scanning corresponding direction (first direction) is smaller than the beam diameter of the incident light beam and whose aperture width in the main-scanning corresponding direction (second direction) is equal to or larger than the beam diameter of the incident light beam, and that reflects the light beam entering the periphery of the aperture as a monitoring light beam; the photoreceptor 18 that receives the monitoring light beam; and the monitoring optical system that leads the monitoring light beam reflected by the first aperture plate 14 to the photoreceptor 18.

The relationship of |(Pap1−Pap2)/Pap2|<|(P1−P2)/P2| is satisfied, where P2 is a light intensity of the light beam entering the first aperture plate 14 at a time t2 when 2 microseconds have passed since current was applied to the surface emitting laser, P1 is a light intensity of the light beam entering the first aperture plate 14 at a time t1 when 40 nanoseconds have passed since a light intensity of the light beam entering the first aperture plate 14 reached 0.1 time the light intensity P2 at the time t2, Pap2 is a light intensity of the light beam output from the first aperture plate 14 at the time t2, and Pap1 is a light intensity of the light beam output from the first aperture plate 14 at a time t1' when 40 nanoseconds have passed since a light intensity of the light beam output from the aperture member reached 0.1 time the light intensity Pap2 at the time t2.

The magnitude relationship between Pap1 and Pap2 when the output of the light-emitting element is the maximum rated output is inverse to the magnitude relationship between Pap1 and Pap2 when the output of the light-emitting element is ¼ of the maximum rated output.

In this case, when the light amount of a light beam passing through the aperture of the first aperture plate 14 is changed within the allowable range, fluctuation due to the unstable state of the light amount at start-up can be reduced as compared with the fluctuation in the conventional device. In other words, a light beam whose rising characteristics are stable can be output regardless of the light amount.

Therefore, the image quality does not decrease even when the optical characteristics of the optical system of the optical scanning device 1010 change due to temperature change, aged deterioration, and other changes and the light amount of the light beam passing through the aperture of the first aperture plate 14 is changed in order to deal with the changes.

Moreover, the image quality does not decrease even when the photosensitivity of the photosensitive drum 1030 changes due to aged deterioration and other changes and the light amount of the light beam passing through the aperture of the first aperture plate 14 is changed in order to deal with the changes.

In other words, the optical scanning device 1010 according to the present embodiment includes the light source device 10 and thus can optically scan the surface of the photosensitive drum 1030 precisely stably.

Light use efficiency in a plurality of optical scanning devices is not always uniform due to fluctuation in optical element production, fluctuation in installation positions, and other fluctuations. Therefore, each of the optical scanning devices adjusts the light amount output from the light source device so that the light amount on the surface of the photosensitive drum becomes a predetermined light amount. In this process, when the light source devices of the optical scanning devices are all produced as the light source device 10, all of the optical scanning devices can optically scan precisely because the rising characteristics are stable even when the light amount output from the light source device 10 is adjusted. Accordingly, the product yield of the optical scanning devices can be improved. Moreover, even when the light amount output from the light source device 10 is adjusted depending on the change in the ambient temperature, the rising characteristics are stable, and thus, stable optical scanning can be performed. In other words, the optical scanning devices can withstand various usage environments.

The light source 11 includes a plurality of light-emitting elements, and thus, a plurality of scans can be performed simultaneously to increase the speed of image formation.

The laser printer 1000 according to the present embodiment includes the optical scanning device 1010 and thus can stably form images with high quality.

The light source 11 includes a plurality of light-emitting elements and thus can achieve high image density.

The case where the two-dimensional array 100 includes forty light-emitting elements is described in the embodiment described above, but it is not limited thereto.

The case where light source 11 includes the two-dimensional array 100 is described in the embodiment described above, but it is not limited thereto. For example, the light source 11 may include a one-dimensional array in which a plurality of light-emitting elements is arranged in a line instead of the two-dimensional array 100. Alternatively, the light source 11 may include one light-emitting element instead of the two-dimensional array 100.

The case where the light source device includes a monitoring optical system is described in the embodiment described above, but it is not limited thereto, and at least a part of the monitoring optical system may be provided separately from the light source device.

In the embodiment described above, the aperture of the first aperture plate 14 may be set so that the length (width) in the main-scanning corresponding direction is smaller than the beam diameter Db of a light beam entering the first aperture plate 14, and that the length (width) in the sub-scanning corresponding direction is set so as to be equal to or larger than the beam diameter Db or.

The case where the image forming apparatus is the laser printer 1000 is described in the embodiment described above, but it is not limited thereto. To put it briefly, the image forming apparatus may at least include the optical scanning device 1010.

For example, the image forming apparatus may be an image forming apparatus directly radiating laser light onto a medium (such as paper) coloring by the laser light.

The image forming apparatus may be an image forming apparatus in which a silver-salt film is used as an image carrier. In this case, a latent image is formed on the silver-salt film by optical scanning, and the latent image can be visualized by a process same as a development process in a common silver halide photography process. The image can be transferred onto photographic paper by a process same as a printing process in a common silver halide photography process. Such image forming apparatuses can serve as an optical plate-making device or an optical drawing device for drawing CT scan images or the like.

Figure 24:
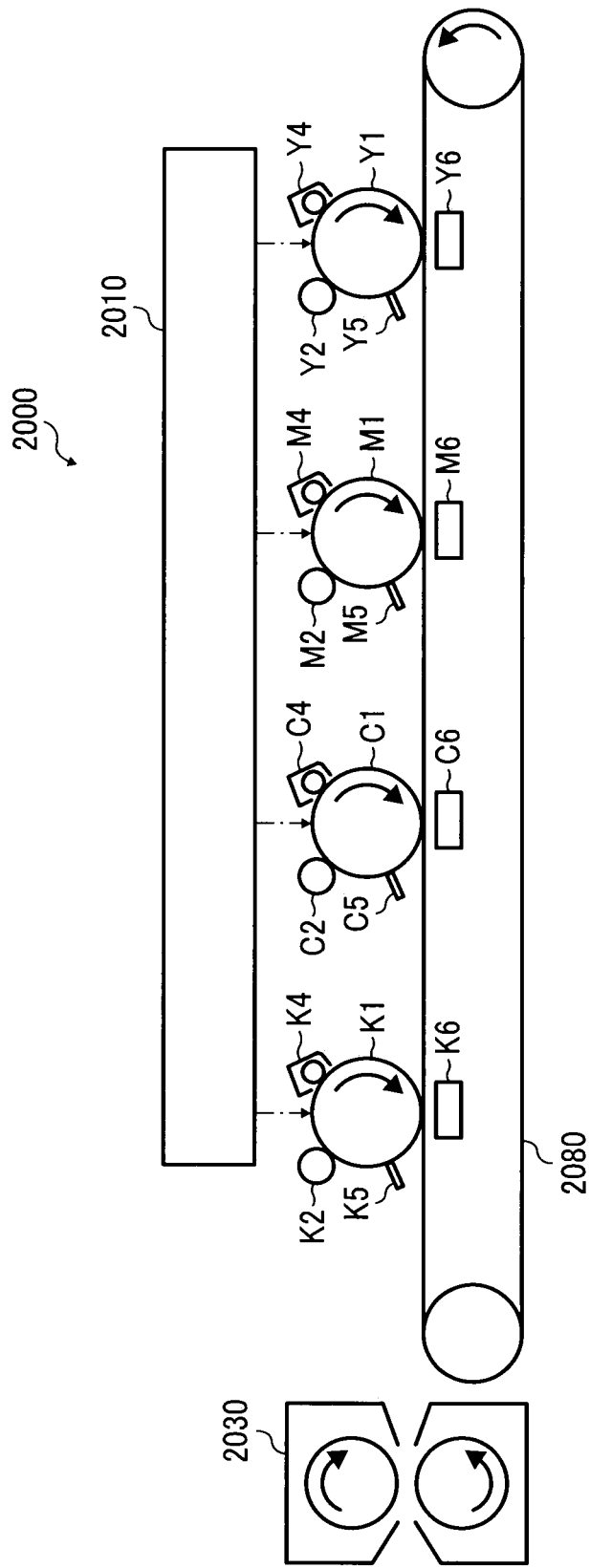
FIG. 24 is a schematic diagram of a color printer.
Figure 25:
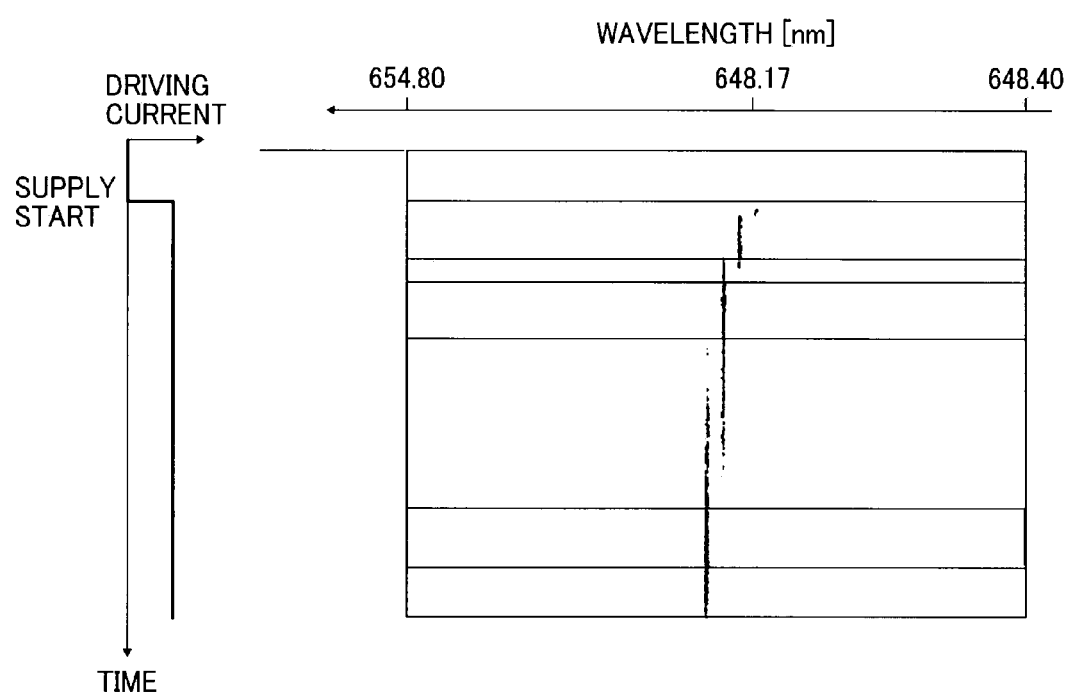
FIG. 25 is a graph for explaining mode hopping caused in an edge emitting laser.

For example, as illustrated in FIG. 24, the image forming apparatus may be a color printer 2000 including a plurality of photosensitive drums.

The color printer 2000 is a tandem multiple color printer that forms images in full color by superimposing four colors (black, cyan, magenta, and yellow). The color printer 2000 includes: for example, "a photosensitive drum K1, a charging unit K2, a developing unit K4, a cleaning unit K5, and a transfer unit K6" for black; "a photosensitive drum C1, a charging unit C2, a developing unit C4, a cleaning unit C5, and a transfer unit C6" for cyan; "a photosensitive drum M1, a charging unit M2, a developing unit M4, a cleaning unit M5, and a transfer unit M6" for magenta; "a photosensitive drum Y1, a charging unit Y2, a developing unit Y4, a cleaning unit Y5, and a transfer unit Y6" for yellow; an optical scanning device 2010, a transfer belt 2080, and a fixing unit 2030.

The photosensitive drums rotate in the corresponding arrow directions in FIG. 24. The charging unit, the developing unit, the transfer unit, and the cleaning unit are arranged around each photosensitive drum in its rotation direction.

Each of the charging units uniformly charges the surface of the corresponding photosensitive drum. The optical scanning device 2010 optically scans the surface of each photosensitive drum charged by the charging unit to form a latent image on the photosensitive drum.

The corresponding developing unit forms a toner image on the surface of the photosensitive drum. Subsequently, the corresponding transfer unit sequentially transfers the toner image in each color onto a recording sheet on the transfer belt 2080, and finally, the fixing unit 2030 fixes the image on the recording sheet.

The optical scanning device 2010 includes a light source device similar to the light source device 10 for each color.

Accordingly, the optical scanning device 1010 can obtain effects similar to those obtained in the optical scanning device 1010.

As a result, the color printer 2000 can obtain effects similar to those obtained in the laser printer 1000.

Although the tandem multiple color printer may cause color deviation in each color due to factors related to machine accuracy or the like, accuracy in correcting color deviation in each color can be enhanced by selecting the light-emitting element to be lighted.

The color printer 2000 may include an optical scanning device per color or per two colors.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light source device comprising:
    a surface emitting laser;
    a coupling optical system that couples a light beam output from the surface emitting laser; and
    an aperture member having an aperture that regulates the light beam from the coupling optical system, the aperture being formed in such a size that a relationship of $|(Pap1-Pap2)/Pap2|<|(P1-P2)/P2|$ is satisfied,
    where P2 is a light intensity of the light beam entering the aperture member at a time t2 when 2 microseconds have passed since current was applied to the surface emitting laser,
    P1 is a light intensity of the light beam entering the aperture member at a time t1 when 40 nanoseconds have passed since a light intensity of the light beam entering the aperture member reached 0.1 times the light intensity P2 at the time t2,
    Pap2 is a light intensity of the light beam output from the aperture member at the time t2, and
    Pap1 is a light intensity of the light beam output from the aperture member at a time t1" when 40 nanoseconds have passed since a light intensity of the light beam output from the aperture member reached 0.1 times the light intensity Pap2 at the time t2.

2. The light source device according to claim 1, wherein
    a beam diameter of the light beam is a width of the light beam where a light intensity is equal to or more than ½ of a center intensity of the light beam, and
    a width of the aperture of the aperture member is smaller than a beam diameter of an incident light beam in a first direction within a plane perpendicular to a principal ray direction of the light beam entering the aperture, and is equal to or larger than the beam diameter of the incident light beam in a second direction perpendicular to the first direction.

3. The light source device according to claim 2, wherein, in spacial light intensity distribution of the light beam passed through the aperture, a first value obtained by dividing a lowest value by a largest value of light intensity on a virtual line that passes through center of the spacial light intensity distribution and that is parallel to the first direction is larger than a second value obtained by dividing a lowest value by a largest value of light intensity on a virtual line that passes through the center of the spacial light intensity distribution and that is parallel to the second direction.

4. The light source device according to claim 3, wherein
    the first value is equal to or more than 0.9, and
    the second value is equal to or less than 0.5.

5. The light source device according to claim 1, wherein the surface emitting laser includes a plurality of light-emitting elements.

6. An optical scanning device that scans a surface to be scanned with a light beam in a main-scanning direction, the optical scanning device comprising:
    the light source device according to claim 1;
    a deflector that deflects the light beam output from the light source device; and
    a scanning optical system that condenses the light beam deflected by the deflector on the surface to be scanned.

7. The optical scanning device according to claim 6, wherein, in spacial light intensity distribution of the light beam output from the light source device,
    a first value obtained by dividing a lowest value by a largest value of light intensity on a virtual line that passes through center of the spacial light intensity distribution and that is parallel to a direction corresponding to the main-scanning direction is equal to or less than 0.5, and
    a second value obtained by dividing a lowest value by a largest value of light intensity on a virtual line that passes through the center of the spacial light intensity distribution and that is parallel to a direction corresponding to a sub-scanning direction perpendicular to the main-scanning direction is equal to or more than 0.9.

8. The optical scanning device according to claim 6, wherein
    the surface to be scanned has photosensitivity,
    a light amount of the light beam condensed on the surface to be scanned has an allowable range depending on the photosensitivity,
    when a driving signal near a lower limit of the allowable range is supplied to the light source device, a light amount of the light beam output from the light source device monotonically increases to be a stable state, and
    when a driving signal near an upper limit of the allowable range is supplied to the light source device, a light amount of the light beam output from the light source device is overshot and then becomes a stable state.

9. An image forming apparatus comprising:
    at least one image carrier; and
    at least one optical scanning device according to claim 6 that scans the at least one image carrier using a light beam modulated according to image information.

10. The image forming apparatus according to claim 9, wherein the image information is multiple color image information.

11. The optical scanning device according to claim 1, wherein a magnitude relationship between Pap1 and Pap2 when an output of the surface emitting laser is a maximum rated output is inverse to the magnitude relationship between Pap1 and Pap2 when the output of the surface emitting laser is ¼ of the maximum rated output.

* * * * *